United States Patent
Hornstein et al.

(10) Patent No.: US 11,415,728 B2
(45) Date of Patent: Aug. 16, 2022

(54) SYSTEM AND METHOD FOR HOLOGRAPHIC DISPLAYS

(71) Applicant: Looking Glass Factory, Inc., Brooklyn, NY (US)

(72) Inventors: Alexis Hornstein, Brooklyn, NY (US); Lee Shiu Pong, Brooklyn, NY (US); Shawn Michael Frayne, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

(21) Appl. No.: 17/332,479

(22) Filed: May 27, 2021

(65) Prior Publication Data

US 2021/0373205 A1    Dec. 2, 2021

Related U.S. Application Data

(60) Provisional application No. 63/030,799, filed on May 27, 2020.

(51) Int. Cl.
*G02B 30/27*    (2020.01)
*G02B 5/00*    (2006.01)

(52) U.S. Cl.
CPC .............. *G02B 5/003* (2013.01); *G02B 30/27* (2020.01); *G02B 2207/123* (2013.01)

(58) Field of Classification Search
CPC .. G02B 5/003; G02B 30/27; G02B 2207/123; G02B 5/00; G02B 5/08; G02B 30/26; G02B 30/30; G02B 30/56; G02B 27/22; H04N 13/31; H04N 13/388

See application file for complete search history.

(56) References Cited

U.S. PATENT DOCUMENTS

| | | | | |
|---|---|---|---|---|
| 4,140,370 A | * | 2/1979 | Snaper | G02B 30/40 359/479 |
| 4,340,275 A | | 7/1982 | Henkes | |
| 4,561,731 A | | 12/1985 | Kley | |
| 4,964,695 A | * | 10/1990 | Bradley, Jr. | G03B 21/602 348/E9.025 |
| 5,233,373 A | | 8/1993 | Peters et al. | |
| 5,359,454 A | * | 10/1994 | Steenblik | B29D 11/00278 359/619 |

(Continued)

FOREIGN PATENT DOCUMENTS

| | | |
|---|---|---|
| CN | 103852819 A | 6/2014 |
| CN | 106125322 A | 11/2016 |

(Continued)

OTHER PUBLICATIONS

International Search Report and the Written Opinion, Application No. PCT/US19/015235, dated Apr. 4, 2019.

(Continued)

*Primary Examiner* — Balram T Parbadia
(74) *Attorney, Agent, or Firm* — Jeffrey Schox; Randy Mehlenbacher

(57) ABSTRACT

A holographic display can include a light source configured to output light; a parallax generator optically coupled to the light source; an optical volume, where the light is perceivable as a three dimensional image within the optical volume; optionally, a flip controller; and, optionally, a viewcone expander.

19 Claims, 10 Drawing Sheets

(56) References Cited

U.S. PATENT DOCUMENTS

| | | | |
|---|---|---|---|
| 5,396,303 A | 3/1995 | Peters et al. | |
| 5,420,689 A | 5/1995 | Siu | |
| 5,519,533 A | 5/1996 | Nomura et al. | |
| 5,521,724 A | 5/1996 | Shires | |
| 5,548,427 A | 8/1996 | May | |
| 5,852,512 A * | 12/1998 | Chikazawa | G02B 30/27 359/477 |
| 5,871,266 A | 2/1999 | Negishi et al. | |
| 6,002,518 A | 12/1999 | Faris | |
| 6,064,424 A | 5/2000 | Van et al. | |
| 6,462,871 B1 | 10/2002 | Morishima | |
| 6,649,925 B2 | 11/2003 | Talmi | |
| 6,771,419 B1 * | 8/2004 | Yamagishi | G03B 21/62 348/E9.025 |
| 6,798,390 B1 | 9/2004 | Sudo et al. | |
| 6,888,612 B2 | 5/2005 | Faris | |
| 6,927,769 B2 | 8/2005 | Roche | |
| 6,950,493 B2 | 9/2005 | Besson | |
| 7,006,125 B2 | 2/2006 | Divelbiss et al. | |
| 7,180,554 B2 | 2/2007 | Divelbiss et al. | |
| 7,215,357 B1 | 5/2007 | Swift et al. | |
| 7,355,658 B2 | 4/2008 | Ioki et al. | |
| 7,432,901 B2 | 10/2008 | Baek et al. | |
| 7,432,996 B2 | 10/2008 | Ioki et al. | |
| 7,489,311 B2 | 2/2009 | Lee | |
| 7,545,466 B2 | 6/2009 | Lee | |
| 7,580,085 B2 | 8/2009 | Jacobs et al. | |
| 7,612,833 B2 | 11/2009 | Kim | |
| 7,623,111 B2 | 11/2009 | Ioki et al. | |
| 7,697,750 B2 | 4/2010 | Simmons | |
| 7,714,946 B2 | 5/2010 | Hong et al. | |
| 7,753,529 B2 | 7/2010 | Fukaishi et al. | |
| 7,804,549 B2 | 9/2010 | Ioki et al. | |
| 7,808,564 B2 | 10/2010 | Tamura et al. | |
| 7,855,756 B2 | 12/2010 | Hong et al. | |
| 7,876,350 B2 | 1/2011 | Shin et al. | |
| 7,876,489 B2 | 1/2011 | Gandhi et al. | |
| 8,213,082 B2 | 7/2012 | Gaides et al. | |
| 8,248,694 B2 | 8/2012 | Sugiyama | |
| 9,479,767 B2 | 10/2016 | Van Der Horst | |
| 9,486,386 B2 | 11/2016 | Bathiche et al. | |
| 9,654,768 B2 | 5/2017 | Qin et al. | |
| 9,686,535 B2 | 6/2017 | Hamagishi et al. | |
| 10,924,817 B2 | 2/2021 | Defaria et al. | |
| 10,948,648 B2 | 3/2021 | Ihas et al. | |
| 2004/0165262 A1 | 8/2004 | Alejo | |
| 2004/0169928 A1 * | 9/2004 | Nilsen | G02B 5/136 359/529 |
| 2004/0240777 A1 * | 12/2004 | Woodgate | G02F 1/1326 385/11 |
| 2005/0078370 A1 | 4/2005 | Nishihara et al. | |
| 2005/0168815 A1 | 8/2005 | Maruyama et al. | |
| 2005/0168816 A1 | 8/2005 | Fukaishi et al. | |
| 2006/0146404 A1 | 7/2006 | Ioki et al. | |
| 2006/0191177 A1 | 8/2006 | Engel | |
| 2006/0192746 A1 | 8/2006 | Ioki et al. | |
| 2006/0203084 A1 | 9/2006 | Okazaki et al. | |
| 2006/0221444 A1 | 10/2006 | Fukaishi et al. | |
| 2006/0244918 A1 * | 11/2006 | Cossairt | G02B 30/25 353/7 |
| 2007/0091436 A1 | 4/2007 | Aoki et al. | |
| 2007/0164950 A1 | 7/2007 | Tajiri | |
| 2007/0165145 A1 | 7/2007 | Sugiyama | |
| 2007/0222954 A1 | 9/2007 | Hattori | |
| 2008/0239483 A1 | 10/2008 | Kuroda et al. | |
| 2008/0239485 A1 | 10/2008 | Kuroda et al. | |
| 2008/0297592 A1 | 12/2008 | Oyamada et al. | |
| 2008/0297897 A1 | 12/2008 | Oyamada et al. | |
| 2008/0304151 A1 | 12/2008 | Ura | |
| 2009/0067057 A1 | 3/2009 | Sprague et al. | |
| 2009/0073087 A1 * | 3/2009 | Janson | G02B 30/27 345/55 |
| 2009/0141122 A1 | 6/2009 | Hong | |
| 2009/0190213 A1 | 7/2009 | Tamura et al. | |
| 2010/0007716 A1 | 1/2010 | Lee et al. | |
| 2010/0265230 A1 | 10/2010 | Kang | |
| 2011/0025833 A1 | 2/2011 | Baik et al. | |
| 2011/0063424 A1 | 3/2011 | Matsuhiro et al. | |
| 2012/0002123 A1 | 1/2012 | Kang | |
| 2012/0139897 A1 * | 6/2012 | Butler | H04N 13/31 345/419 |
| 2012/0313896 A1 | 12/2012 | Noda | |
| 2013/0201573 A1 | 8/2013 | Shiota | |
| 2013/0307948 A1 * | 11/2013 | Odake | H04N 13/368 348/59 |
| 2014/0118511 A1 | 5/2014 | Hyde et al. | |
| 2014/0204464 A1 * | 7/2014 | Halverson | G02F 1/133524 359/599 |
| 2014/0320614 A1 | 10/2014 | Gaudreau | |
| 2014/0347454 A1 | 11/2014 | Qin et al. | |
| 2015/0022887 A1 | 1/2015 | Larson et al. | |
| 2016/0021365 A1 | 1/2016 | Effendi et al. | |
| 2016/0101013 A1 | 4/2016 | Bathiche et al. | |
| 2016/0234487 A1 | 8/2016 | Kroon et al. | |
| 2017/0078650 A1 | 3/2017 | Frayne et al. | |
| 2017/0139213 A1 | 5/2017 | Schmidtlin | |
| 2018/0035096 A1 | 2/2018 | Gemayel | |
| 2018/0188550 A1 * | 7/2018 | Frayne | G02B 30/25 |
| 2019/0146234 A1 * | 5/2019 | Yoshida | H04N 13/30 353/10 |
| 2019/0149808 A1 | 5/2019 | Ng et al. | |
| 2019/0196539 A1 | 6/2019 | Cassar | |
| 2019/0268588 A1 | 8/2019 | Frayne et al. | |
| 2019/0346615 A1 * | 11/2019 | Johnson | G02B 5/136 |
| 2020/0228881 A1 | 7/2020 | Defaria et al. | |

FOREIGN PATENT DOCUMENTS

| | | |
|---|---|---|
| EP | 0294122 A1 | 12/1988 |
| EP | 1965245 A1 | 9/2008 |
| JP | 2010068202 A | 3/2010 |
| KR | 20140111553 A | 9/2014 |
| WO | 9500872 A1 | 1/1995 |
| WO | 9854548 A1 | 12/1998 |
| WO | 0197531 A2 | 12/2001 |
| WO | 02076107 A1 | 9/2002 |
| WO | 2004066203 A2 | 8/2004 |
| WO | 2004111913 A2 | 12/2004 |
| WO | 2006015562 A1 | 2/2006 |
| WO | 2008091407 A2 | 7/2008 |
| WO | 2010067506 A1 | 6/2010 |

OTHER PUBLICATIONS

"Nanostructured Moth-Eye Anti-Reflective Coating", Synopsys, https://www.synopsys.com/photonic-solutions/product-applications/rsoft-optimization-nanostructured-moth-eye.html.

"Privacy Screens for Laptops, Computers & Monitors", Pinterest, https://in.pinterest.com/pin/656892295631728414/.

Dong, Yan-Yu , et al., "P-68: Dual-Side Floating Autosteroscopic 3D Display Based on Micro-Prism Array and Lenticular Sheet", SID Symposium Digest of Technical Paper / vol. 47, Issue 1, May 25, 3016.

Geng, Jason , "Three-dimensional display technologies", IEEE Intelligent Transportation System Society, Advances in Optics and Photonics 5, 456-535 (2013) received May 28, 2013.

Wang, Yuedi, et al., "Three-dimensional light-field display with enhanced horizontal viewing angle by introducing a new lenticular lens array", Optics Communications 477 (2020) 126327, received May 12, 2020.

Brar, Rajwinder Singh, et al., "Laser-Based Head-Tracked 3D Display Research", Journal of display technology, IEEE Service center, NY, US, vol. 6, No. 10, Oct. 1, 2010, pp. 531-543, XP011308937, ISSN: 1551-319X.

Liou, Jian-Chiun , et al., "Dynamic LED backlight 2D/3D switchable autostereoscopic multi-view display", Journal of display technology, IEEE Service center, NY, US, vol. 10, No. 8, Aug. 1, 2014, pp. 629-634, XP0111551837, ISSN: 1551-319X, DOI: 10.1109/JDT.2014.2307691.

(56) References Cited

OTHER PUBLICATIONS

Urey, Hakan, et al., "State of the art in stereoscopic and autostereoscopic displays", Proceedings of the IEEE, IEEE. New York, US, vol. 99, No. 4, Apr. 1, 2011 (Apr. 1, 2011), pp. 540-555. XP011363625, ISSN: 0018-9219, DOI: 10.1109/JPROC. 2010.2098351.

\* cited by examiner

↑ 128

↑ 185

↑ 185

↑ 185

↑ 185

↑ 185

↑ 185

133
128

SYSTEM AND METHOD FOR HOLOGRAPHIC DISPLAYS

CROSS-REFERENCE TO RELATED APPLICATIONS

This application claims the benefit of U.S. Provisional Application No. 63/030,799, filed 27 May 2020, which is incorporated in its entirety by this reference.

TECHNICAL FIELD

This invention relates generally to the holographic display field, and more specifically to a new and useful system and method in the holographic display field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
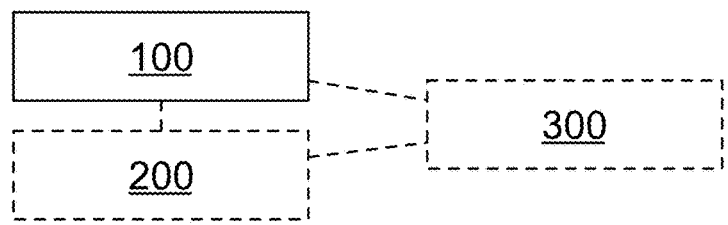
FIG. 1 is a schematic representation of the system.
Figure 2A:
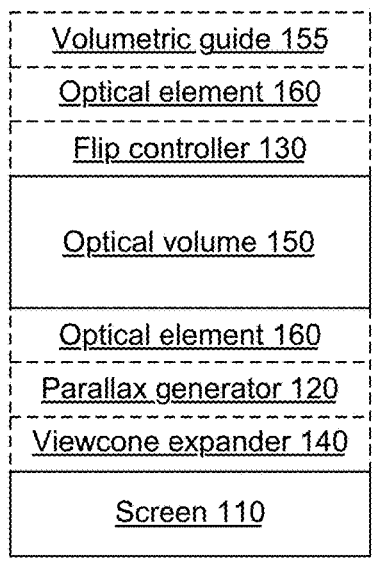
FIGS. 2A, 2B, and 2C are schematic representations of examples of displays.
Figure 2B:
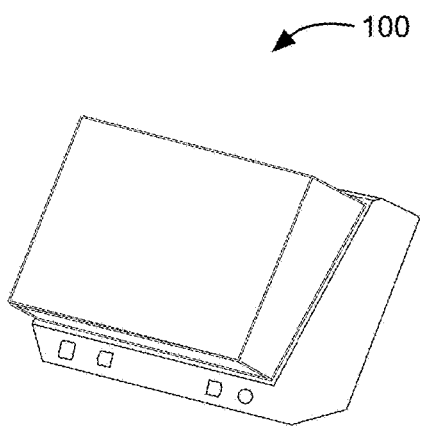

As shown in FIG. 1, the system can include a display. The system can optionally include one or more sensors, one or more computing system, and/or any suitable components. As shown for example in FIGS. 2A, 2B, and 2C, the display can include one or more: screen, optical element, parallax generator, viewcone expander, flip controller, optical volume, volumetric guide, and/or any component.

2. Benefits

Variations of the technology can confer several benefits and/or advantages.

First, the inventors have discovered that using filters (e.g., a privacy screen) with poorly matched indices of refraction (e.g., index of refraction difference greater than about 0.001, 0.005, 0.01, 0.02, 0.03, 0.05, etc.) can lead to undesirable image blurring, duplication, and/or other optical artifacts. In specific examples, the index of refraction mismatch can be between a microlouver array and a filler or support material surrounding the microlouver array; between a filter and another optical element of the display; and/or between any suitable optical elements.

Figure 3:
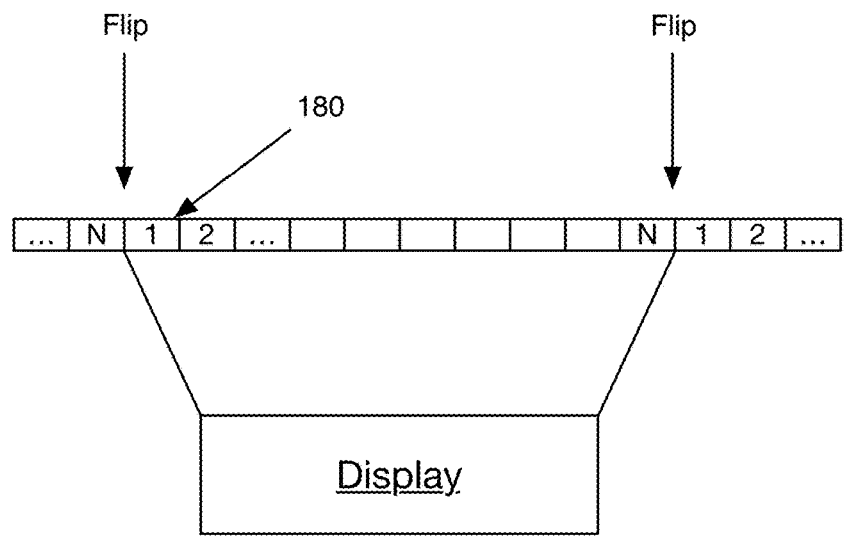
FIG. 3 is a schematic representation of an example of where flip can occur.
Figure 4A:
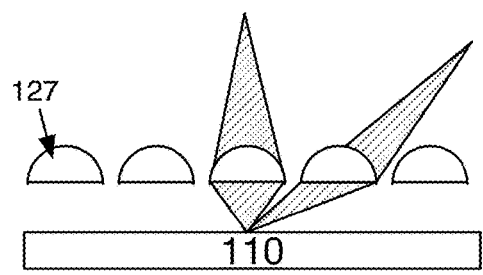
FIG. 4A is a schematic representation of an example of flip being generated by light emitted from a point of the screen that is scattered by a lenticule that is not immediately adjacent to the point.

Second, variants of the technology can decrease and/or prevent one or more viewers from experiencing flip. As shown for example in FIG. 3, flip can refer to a region in space where views 180 switch rapidly (e.g., discontinuously such as from view N to view 1) as opposed to continuously (e.g., from view a to a+1, from view a to a−1 where a is an integer between 1 and N), such as at the edges of a viewcone, from the perspective of a user viewing the device. The experience of flip can be particularly apparent (and/or problematic) when the flip is present in the same spatial region as another viewcone. However, flip can be otherwise caused or experienced. The inventors have discovered that flip is generated by views (e.g., light) straying outside of the desired viewing angle and leaking into adjacent parallax generator elements (examples shown in FIG. 4A). In specific examples, including a flip controller can limit the direction that views (e.g., light) can travel, thereby removing the source of the flip.

Third, variants of the technology can enable broader viewcones to be realized (e.g., than the display would otherwise enable). In specific examples, including a viewcone expander can enable views that would otherwise be sent (intentionally) to only a single location (and/or viewer) can be transmitted to two or more locations (and/or viewers).

However, variants of the technology can confer any other suitable benefits and/or advantages.

3. System

The display 100 preferably functions to present a free-space 3D image (e.g., a lightfield image, a 3D image, a holographic-like image, etc.) of a scene. The display 100 preferably presents the free-space 3D image without using peripherals (e.g., glasses, goggles, polarizing films, headsets, etc.), but the display can use peripherals. The free-space 3D image is preferably viewable by a plurality of viewers at once (e.g., each viewer can see different perspectives of the scene at the same time, each viewer can see the same perspective of the scene at the same time, a subset of viewers can see the same view(s) at the same time, etc.). However, the display can accommodate a single viewer and/or any suitable number of viewers. The free-space 3D image can include any suitable number of views (e.g., images of the scene such as showing different perspectives) between 1-1000 views such as 2, 4, 8, 12, 20, 45, 50, 75, 90, 100, 135, 150. However, the free-space 3D image can include greater than 1000 views and/or any suitable number of views. Each viewer preferably perceives a plurality of views (e.g., 1 view per eye, more than one view per eye), but each viewer can perceive a single view and/or any suitable number of views. Perceiving a plurality of views can function to enable (and/or enhance) the viewer perception of depth (and/or perspective) of the scene in the free-space 3D image.

The display preferably operates based on a set of operation parameters. The operation parameters can include: number of viewers, mode of operation (e.g., interactive mode; display mode; static mode such as to display a still image; dynamic mode such as to display a video; tracking mode; etc.), brightness, contrast, color mode (e.g., black and white, RGB, etc.), calibration parameters (e.g., alignment between the pixel grid and the lenticular grid, slope, center, pitch, serial number, model number, change in slope, change in center, change in pitch, display viewcone inversion, flip controller viewcone, etc.), pixel (and/or subpixel) arrangement, power, and/or any suitable operation parameters.

As shown in FIGS. 3 and 5A-5D, the display can project views into a region of space referred to as a display viewcone 170. The display viewcone 170 can be set based on the optical elements, the optical volume, the parallax generator, the screen, the flip controller(s) (e.g., a flip controller viewcone), the viewcone expander, and/or any suitable component. The views can be projected into an arc (e.g., opposing the screen across the optical volume) ranging between approximately 1° to 160° such as about 60°. The viewcone can be any suitable fraction of the arc that the views can be projected into (e.g., 10%, 20%, 33%, 50%, 75%, 100%, etc.), a fixed angular spread (e.g., 10°, 20°, 30°, 50°, 60°, 75°, 90°, 100°, 120°, 135°, 150°, etc.), and/or any suitable arc angle. When the viewcone does not span the full view arc, the display viewcone can be directed in any suitable direction within the view arc (e.g., by digitally changing a center of the displayed image). The viewcone is preferably contiguous, but can be noncontiguous. Usually, only viewers within the display viewcone can perceive views. However, in some variants, viewers outside the display viewcone may perceive views (e.g., ghost views, secondary views, etc.); such as views that can result from views passing through non-preferential and/or non-primary paths of the parallax generator and/or the optics of the display.

The display can define a projection axis, where views are projected in a direction based on the projection axis. The projection axis is preferably coaligned with a center of the view cone or view arc, but can be defined perpendicular to a surface of the display or a component thereof, parallel to a surface of the display or a component thereof, along an axis defined between the display and a viewer (e.g., where each viewer can be associated with a distinct projection axis), and/or otherwise be defined. The projection axis can function as a reference axis, where other angles can be defined relative to the projection axis. However, the projection axis can otherwise be defined. In some variants, two or more projection axes can be defined. In these variants, each projection axis is preferably associated with a distinct viewcone, but they can be associated with the same viewcone. The viewcones for different projection axes can overlap or not overlap.

The screen 110 preferably functions to output light (e.g., in specific directions, with specific colors, etc.). The screen can be a liquid crystal screen (e.g., including a light source such as a back light, front light, etc.; a set of polarization optics; a liquid crystal screen; etc. such as arranged), an organic light emitting diode (OLED) screen, a quantum-dot light emitting diode (QD-LED) screen, a cathode ray tube (CRT) screen, a micro-LED screen, a mini-LED screen, and/or any suitable technology. The screen is preferably arranged the furthest upstream within the display, but can be arranged downstream relative to the parallax generator, optical elements, optical volume, flip controller, viewcone expander, and/or any other component.

The screen is preferably associated with a plurality of pixels. The pixels can be individually addressable light emitters, individually addressable light blockers (e.g., liquid crystal modulators), subsets of contemporaneously addressable light emitters, subsets of contemporaneously addressable light blockers, and/or any suitable element. The pixels are preferably arranged on a pixel grid, but can be arranged in any suitable manner. The pixel grid is preferably a regular grid such as a linear grid, a curvilinear grid, skewed grid, and/or any suitable regular grid. However, the pixel grid can be irregular (e.g., include non-equal spacing). Each pixel can be square, rectangular, circular, oblate, polygonal, and/or any suitable shape. Each pixel can be in contact with neighboring pixels and/or separated from neighboring pixels (e.g., by a pixel separation distance). Each pixel can be individual addressable or addressable in sets of pixels. The screen can include any number and/or range thereof of pixels between about 1 and $1 \times 10^8$ pixels such as 10, $1 \times 10^2$, $1 \times 10^3$, $1 \times 10^4$, $1 \times 10^5$, $2.3 \times 10^5$, $5 \times 10^5$, $1 \times 10^6$, $2 \times 10^6$, $5 \times 10^6$, $1 \times 10^7$, $2 \times 10^7$, $6.7 \times 10^7$ pixels. However, the screen can include more than $1 \times 10^8$ pixels, and/or any suitable number of pixels. In specific examples, the pixels can be arranged in rectangular grids that are 640×360, 800×600, 1024×768, 1280×720, 1280×1024, 1360×768, 1600×900, 2560×1440, 3840×2160, 7680×2160, 8192×4608, 8192×8192 pixels, and/or any pixel resolution.

Each pixel can include one or more sub-pixels. In a specific example, each pixel can include three sub-pixels wherein each sub-pixel corresponds to a different color (e.g., a red sub-pixel, a blue sub-pixel, and a green sub-pixel). In a second specific example, each pixel can correspond to five sub-pixels. However, each pixel can correspond to any suitable number and/or type of sub-pixels. Each sub-pixel can be square, rectangular, circular, oblate, polygonal, and/or any suitable shape.

The optional optical element(s) 160 preferably function to change characteristics of the emitted light (e.g., light and/or views emitted from the screen). The optical elements can function to reduce stray light (e.g., light that bypasses the pixels) from reaching a viewer. Characteristics of the emitted light can include: intensity, wavelength (e.g., color), spatial location of the emission of the optical radiation from the display (e.g., pixel location), polarization, phase, collimation, spread (e.g., the spatial distribution of light from a source, divergence, etc.), and/or any suitable characteristics. The optical elements can be arranged between the screen and the optical volume, between the screen and the parallax generator, between the screen and the flip controller, between the screen and the viewcone expander, upstream of the screen, downstream of the screen, on a surface of the optical volume, independent of the display, and/or at any suitable location. Examples of optical elements can include: polarizers (e.g., wire-grid, transmission, reflection, absorption, etc.), waveplates (e.g., half waveplates, quarter waveplates, etc.), lenses (e.g., spherical, aspherical, cylindrical, any suitable focal length such as between 10 mm and 1000 mm, etc.), neutral density filter, color filter (e.g., reflective filters, absorptive filters, etc.), spatial light modulators (e.g., electrooptic modulators, liquid crystals, microelectromechanical (MEMS) mirrors, etc.), and/or any suitable optical elements.

The parallax generator 120 functions to provide (and/or appear to provide) different views of a scene to a viewer (e.g., a different view to each eye of a viewer, different views to each viewer, views that depend on the viewers location relative to the display, etc.). The parallax generator is preferably downstream of the screen (e.g., along the light propagation direction), and is more preferably the most downstream optical component of the display. However, additionally or alternatively, the parallax generator can be downstream of the optical elements, flip controller, viewcone expander, the optical volume, and/or other components; upstream of the optical elements, flip controller, viewcone expander, the optical volume, and/or other components; collocated with (e.g., integrated into, beside, interspersed with, etc.) the optical elements, flip controller, viewcone expander, the optical volume, and/or other components; integrated with (e.g., merged with, mounted to, as shown for example in FIG. 4B, etc.) the optical elements, screen, flip controller, viewcone expander, the optical volume, and/or other components; and/or arranged in any suitable location. The parallax generator can be separated from (e.g., by a separation distance such as generated by a housing, a frame, by optical elements, etc.) and/or in contact with the screen, optical elements, the optical volume, a flip controller, a viewcone expander, and/or any suitable component. The parallax generator is preferably a lens array (e.g., lenticular array 125, fly-eye lens array, etc.), but can be a parallax barrier (e.g., a series of baffles aligned to pixels and/or subpixels of the screen) and/or any suitable parallax generator.

The lenticular array is preferably a set of lenses (e.g., lenticules 127) arranged on a lenticular grid (e.g., each corner of the grid corresponds to a lens such as a center of the lens, a top of the lens, a bottom of the lens, a left side of the edge, a right side of the edge, etc.; each edge corresponds to a lens such as a center of the lens, a top of the lens, a bottom of the lens, a left side of the edge, a right side of the edge, etc.; etc.). The lenticular grid is preferably a regular grid such as a linear grid, a curvilinear grid, skewed grid, and/or any suitable regular grid. However, the lenticular grid can be irregular (e.g., include non-equal spacing). Each lens of the set of lenses is preferably identical (e.g., shape, size, focal length, material, etc.). However, one or more lens of the set of lenses can be different.

The pitch (e.g., the separation distance between lenses such as along a lateral extent of the lenticular array, along a longitudinal extent of the lenticular array, etc.) can be any suitable value between 10 µm and 1 mm such as 20 µm, 50 µm, 100 µm, 200 µm, 500 µm, 750 µm. However, the pitch can be less than 10 µm, greater than 1 mm, and/or any value.

Each lens can be a microlens (e.g., have a lens diameter less than about 1 mm such as 10 µm, 50 µm, 100 µm, 250 µm, etc.). However, each lens can have any suitable size (e.g., larger than 1 mm). The focal length for each lens can be any suitable value between about 10 µm and 1 mm. However, the focal length can be any suitable value.

The material for each lens can be plastic (e.g., acrylic such as PMMA, APET, PETG, LENSTAR®Plus, Polycarbonate, Polypropylene, PVC, polystyrene, etc.), glass, liquid crystals, and/or any suitable material can be used.

The lenticular array is preferably aligned to intersect the pixels of the screen. The lenticular grid can be rotated by an angle (e.g., between 0-90°) relative to the pixel grid, parallel to the pixel grid, perpendicular to the pixel grid, and/or otherwise oriented. However, the lenticular array and the screen can not be aligned, and/or the lenticular array can otherwise be aligned to the screen.

Each pixel (or subpixel) of the screen is preferably associated with a lenticule of the lenticular array. Typically, the number of pixels is larger than the number of lenticules; however, the number of lenticules can be the same as and/or greater than the number of pixels (e.g., for large displays; for displays using large pixels such as mini-LEDs, signages, etc.; for displays with steerable back lights; etc.). Any number of pixels or subpixels (e.g., 1, 2, 5, 10, 20, 40, 50, 100, 200, 500, >500, values therebetween, etc.) can be associated with a lenticule. The lenticule is preferably associated with the closest pixel (or subpixel), but can be associated with any suitable pixel. However, the lenticules can be associated with any pixel(s) and/or subpixels.

In a first embodiment, one or more lenticules of the lenticular array can be spherical, aspherical, hemispherical, spherical segment, cylindrical, acylindrical, axicon, Fresnel lens, parabolic, and/or any shape.

Figure 12A:
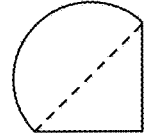
FIGS. 12A-12F are schematic representations of examples of lenticules.
Figure 12B:
Figure 12C:
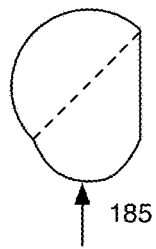
Figure 12D:
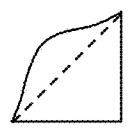
Figure 12E:
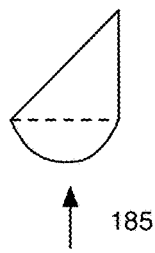
Figure 12F:
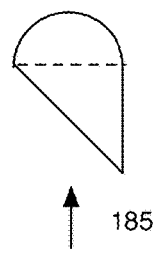

In a second embodiment, one or more lenticules of the lenticular array can be a triangular prism including a semi-cylinder on one face (e.g., as shown in FIGS. 12A, 12E, 12F, and 14); a triangular prism including a semi-cylinder on two or more faces (e.g., as shown for example in FIGS. 12B and 12C); a triangular prism including a hemisphere on one or more faces; a triangular prism including a semi-acylinder on one or more faces (e.g., as shown in FIG. 12D); a triangular prism including a semi-asphere on one or more faces; a frustopyramid including one or more hemispherical, semi-aspherical, semi-parabaloid, semi-cylindrical, and/or semi-cylindrical face(s); a prismatoid including one or more hemi-spherical, semi-aspherical, semi-parabolic, semi-cylindrical, and/or semi-acylindrical face(s); a polyhedron including one or more hemi-spherical, semi-aspherical, semi-parabolic, semi-cylindrical, and/or semi-acylindrical face; a trapezoidal prism including one or more hemi-spherical, semi-aspherical, semi-parabolic, semi-cylindrical, and/or semi-acylindrical face; a prism lens (e.g., a convex prism lens, a concave prism lens, etc.), and/or any suitable geometry. In this embodiment, the lenticule is preferably a unitary body, wherein the geometry is formed by the union of the shapes; however, the lenticule can be otherwise constructed. In this embodiment, the lenticule(s) can be referred to as prismatic lenticules 128. However, prismatic lenticules can otherwise be defined.

The lenticules and/or lenticular array (e.g., a surface of the lenticular array, the material of the lenticular array, etc.) can be configured to focus on the same focal plane (e.g., the plane of color filters on the screen, the viewer position, the screen elements, etc.) or different focal planes. This is particularly beneficial in the second embodiment where different lenticules can have different distances from the plane, but can be used for any lenticular array. In a series of examples, the lenticles can: include different indices of refraction (e.g., a different index of refraction material can be associated with each lenticule where the index of refraction depends on the distance between the lenticule and the plane; a gradient index of refraction, etc.), different curvatures (e.g., each lenticule can have a curvature that depends on the distance, a nonspherical shape where the shape or local curvature depends on the distance between the specific point of the lenticule, etc.), an additional microlens (e.g., a different microlens associated with each lenticule where the microlens focal length depends on the distance to the plane, where the microlens can be above or below the lenticule), and/or in any suitable manner.

Each lenticule of the lenticule array can define an angle. The angle can function to steer the views (and/or light) to a particular direction in space. The angle is preferably one dimensional (e.g., be configured to steer the views along a single reference line such as a horizontal line, vertical line, etc.) but can be two dimensional (e.g., be configured to steer the views horizontally and vertically). The angle is preferably defined between a reference axis of the screen (e.g., an axis parallel to the surface of the screen such as an edge of the screen, a pixel orientation axis, a sub pixel orientation axis, parallel to a light propagation axis, perpendicular to a light propagation axis, etc.) and a reference axis for the lenticule (e.g., the optical axis, the central axis, an axis perpendicular to the optical axis, an edge of the lenticule, etc.) and/or relative to a projection axis. However, the angle can be defined between a reference axis of the lenticular array (e.g., an orientation axis of the lenticular array such as an axis along which lenticules are arranged, a surface of the lenticular array, lenticular array rows, lenticular array columns, the slope, etc.) and a lenticule reference axis, between an optical volume reference axis and a lenticule reference axis, be defined based on a target viewcone, be defined based on one or more viewers, and/or by otherwise defined. In some variants, the angle can change the propagation of light from the screen. For example, instead of light propagating along the propagation axis, the light can be steered (e.g., by approximately the angle, by a value that depends on the angle, by a value that depends on the lenticule material, by a value that depends on the orientation between the lenticule and input light, etc.) in any direction relative to the propagation axis (e.g., horizontally, vertically, diagonally, left, right, up, down, etc. where the direction can depend on the orientation of the angle relative to the propagation axis).

In a first example, the angle can have any value between about 0°-180° such as 10°, 25°, 30°, 50°, 75°, 90°, 105°, 130°, 150°, 155°, and/or 170°. In a second example, the angle can have any be −90°-90° such as −75°, −50°, −45°, −30°, −25°, −10°, 0°, 10°, 25°, 30°, 45°, 50°, and/or 75°. However, the angle can be any value.

In variants, the lenticules can be grouped into lenticule subsets. These variants can be particularly relevant for the second embodiment (e.g., of lenticule shapes), but can be used in any embodiment of the parallax generator. The lenticular array preferably includes repeating (e.g., translationally symmetric) lenticule subsets (e.g., along a lenticular array reference axis, along a screen reference axis, etc.), but can be include non-repeating lenticule subsets, random lenticule subsets, and/or be otherwise arranged with respect to the lenticule subsets. In a specific example, parameters (e.g., focal length, separation distance, angle, pitch, density, index of refraction, etc.) of the lenticular array (and/or a subset thereof) can vary in a linear, non-linear (e.g., polynomial, logarithmic, sinusoidal, etc.), exponential (e.g., super exponential), and/or any suitable manner. For instance, a local lenticular profile (e.g., of a subset of lenticules) can be selected to improve (e.g., optimize) the view quality in a specific direction and/or for viewers at a specific distance. In these examples, a varying local lenticular profile can be beneficial because the specific direction to be optimized is generally different for different pixel locations of the screen (since the viewer is at a finite distance from the display), however, the carrying local lenticular profile can otherwise be beneficial or configured.

The lenticule subsets are preferably reflection symmetric about a reference axis of the lenticule subsets (e.g., a central axis of the lenticule subset, an axis intersecting the center of mass of the lenticule subsets, an axis parallel to a screen surface, an axis normal to a screen surface, the propagation axis, etc.). However, the lenticule subsets can be rotationally symmetric (e.g., about a reference axis of the lenticule subsets), inversion symmetric, asymmetric, partially symmetric (e.g., components above or below a reference plane are symmetric, an improper symmetry, etc.), and/or have any suitable symmetry.

Figure 13A:
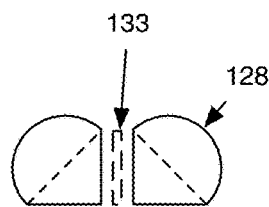
FIGS. 13A-13C are schematic representations of examples of subsets of lenticules.
Figure 13B:
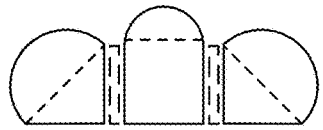
Figure 13C:
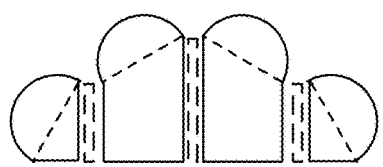
Figure 14:
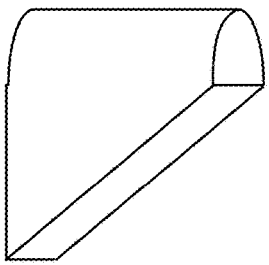
FIG. 14 is a schematic representation of an isometric view of an example of a lenticule.

In a first illustrative example as shown in FIG. 13A, the subset of lenticules can include two lenticules with angles directed in opposing directions (e.g., up and down relative to a central axis, left and right, where the propagation axis can be split into two propagation axes, symmetric about the propagation axis, etc.). In a second illustrative example as shown in FIG. 13B, the subset of lenticules can include three lenticules, where the lenticules on either end of the lenticule subset include angles pointing in opposing directions and the central lenticule of the lenticule subset is oriented at an angle intermediate between the angle of lenticules at either end (e.g., up, center, and down relative to a central or propagation axis; left, center, and right relative to a central or propagation axis; etc.). In a third illustrative example, as shown in FIG. 13C, the subset of lenticules can include four lenticules where the lenticules at either end are pointing in the opposite directions and the lenticules in the middle are directed in opposing directions, where the lenticules in the middle are directed at an angle intermediate between the lenticules at the end (e.g., where the propagation axis can be split into four propagation axes, symmetric about the original propagation axis, etc.). However, the lenticule subset can include any suitable number of lenticules and each of the lenticules can have any angle (e.g., be directed in any direction).

However, any suitable lenticular array can be used.

Figure 11A:
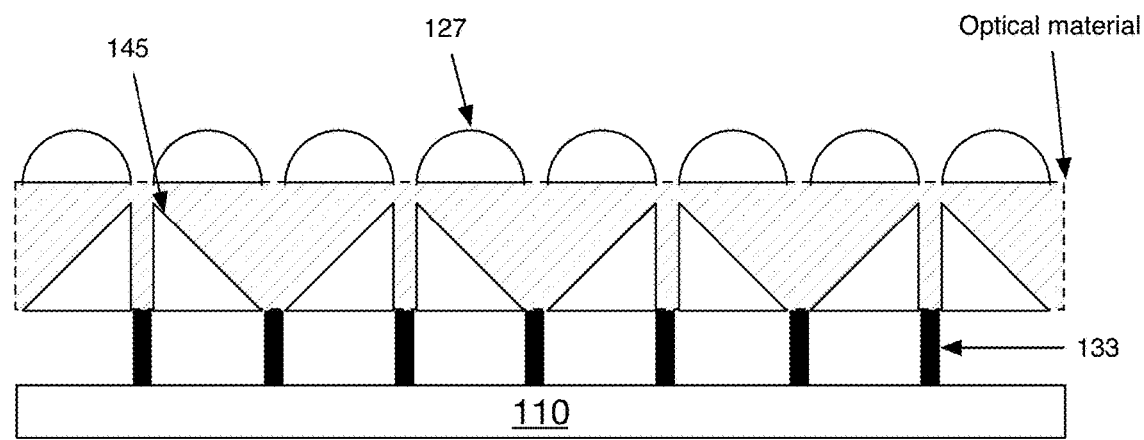
FIG. 11A is a schematic representation of an example of a portion of a display, proximal the screen, where the display includes a baffle, a prism array, a lenticular array, and an optional optical material.
Figure 11B:
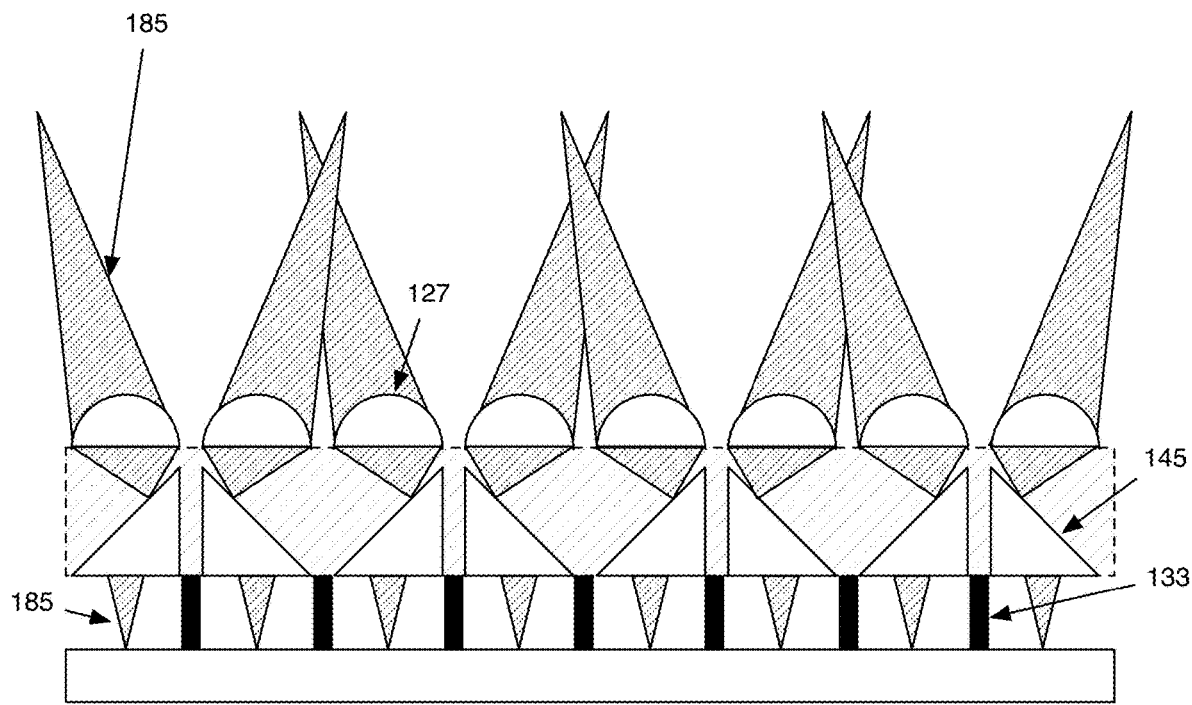
FIG. 11B is a schematic representation of an example of using the example display from FIG. 11A where the views are sent in two directions.

The optional viewcone expander 140 functions to increase the spatial region over which views are presented, for example by redirecting the angle at which light 185 associated with the views are displayed (as shown for example in FIGS. 11A and 11B). Additionally or alternatively, the viewcone expander can transmits views in two or more directions. In specific variants, the inclusion of a viewcone expander can increase the arc of the display viewcone, provide views with a vertical parallax (e.g., expand a display viewcone in a direction perpendicular to a direction that the arc sweeps), and/or otherwise modify the display viewcone. In an illustrative example, a display without a viewcone expander can cover a display viewcone that is about 60°. The same display, including a viewcone expander can have a display viewcone that corresponds to 100°, 150°, 160°, 170°, and/or any suitably widened display viewcone (e.g., a display viewcone greater than about 60°). The angle can defined by an angle of the viewcone expander (and/or individual expander), the viewcone expander orientation, an angle defined between a screen reference axis and a viewcone expander reference axis (e.g., the optical axis of an expander, the optical axis of the viewcone expander, the central axis of an expander, the central axis of the viewcone expander, an axis perpendicular to the optical axis, an edge of the viewcone expander, etc.), an angle defined by a parallax generator reference axis (e.g., lenticular array reference axis) and a viewcone expander reference axis, based on a target viewcone, based on one or more viewers (e.g., viewer locations, anticipated viewer locations, etc.), the propagation axis, and/or otherwise defined. The viewcone expander is preferably arranged between the parallax generator and the screen, but can be adjacent to the screen, the parallax generator, optical elements, optical volume, the flip controller, and/or any component. The viewcone expander can be in contact with the parallax generator and/or separated from the parallax generator by a separation distance. In examples, the viewcone expander can be cemented to, adhered to, touch, and/or otherwise contact the parallax generator. The separation distance can be maintained using optical material (e.g., the same or different materials from the optical volume; transparent material; semitransparent material; index matched material such as index matched to the viewcone expander, to the parallax generator, etc.; high index optical material such as having a greater index of refraction than the viewcone expander, the parallax generator, etc.; low index of refraction optical material such as have a smaller index of refraction than the viewcone expander, the parallax generator, etc.; etc.), spacers, structures, and/or be otherwise maintained.

The viewcone expander preferably includes a plurality of discrete expanders. However, the viewcone expander can include plurality of connected expanders, a single expander, and/or any suitable expanders. Each expander can correspond to an element of the parallax generator (e.g., a lenticule), to an element of the screen (e.g., a pixel, a subpixel, etc.), to a set of lenticules (e.g., a column of lenticules, a row of lenticules, lenticules aligned along the slope, etc.), to a set of pixels (e.g., a column of pixels, a row of pixels, etc.), and/or any suitable component. Each expander is preferably centered (e.g., horizontally centered, vertically centered, aligned, etc.) with respect to the corresponding element. However, the expander alignment can be calibrated and/or measured and corrected for (e.g., using a computing system). In some variants, the expanders can be integrated into the parallax generator (e.g., prismatic lenticules can function as both a viewcone expander and a parallax generator).

Each expander can include one or more: prisms 145 (e.g., right prisms, triangular prisms, truncated prisms, wedges, etc.), gratings (e.g., Bragg gratings, holographic gratings, transmissive gratings, reflective gratings, etc.), a block of material with a nonuniform index of refraction (e.g., a manufactured index of refraction gradient, a patterned index of refraction, etc.), magnetooptics, acousto-optic modulators, liquid crystals (e.g., liquid crystal lens, operable to enable switching between an expanded mode and a normal mode), and/or any suitable expander. Each expander can be made from polymers (e.g., polymethylmethacrylate (PMMA) such as acrylic, polyphosphonate, polyphosphazene, polyferrocenes, polyferrocenylsilanes, polycarbodiimide, polymer nanocomposites, etc.), birefringent material (calcite, β-barium borate, zircon, silicates such as tourmaline, beryl, etc.; silicon carbide, titania, alumina, magnesium fluoride, etc.), glass (e.g., Schott glass, borosilicate, fused silica, silicates, etc.), crystals, liquid crystals (e.g., discotic liquid crystals, conic or bowlic liquid crystals, rod-shaped liquid crystals, etc.), and/or any suitable material. Each expander is preferably substantially identical (e.g., same shape but in different orientations, dimensions that differ by at most 10%, etc.). However, the expanders can be different (e.g., different shapes, different sizes, etc.).

In a specific example, each expander is a triangular prism (e.g., a right triangular prism, oblique triangular prism, uniform triangular prism, etc.) with the same or different base angles. In a second specific example, each expander is a trapezoidal prism (e.g., a right trapezoidal prism, an isosceles trapezoidal prism, etc.). However, each expander can have any suitable geometry.

In variants, the viewcone expander can include subsets of expanders. The viewcone expander preferably includes repeating (e.g., translationally symmetric) expander subsets (e.g., along a viewcone expander reference axis, along a lenticular array reference axis, along a screen reference axis, etc.), but can be include non-repeating expander subsets, random expander subsets, and/or be otherwise arranged with respect to the expander subsets.

The expander subsets are preferably reflection symmetric about a reference axis of the expander subsets (e.g., a central axis of the expander subset, an axis intersecting the center of mass of the expander subsets, an axis parallel to a screen surface, an axis normal to a screen surface, the propagation axis, etc.). However, the expander subsets can be rotationally symmetric (e.g., about a reference axis of the expander subsets), inversion symmetric, asymmetric, partially symmetric (e.g., components above or below a reference plane are symmetric, an improper symmetry, etc.), and/or have any suitable symmetry.

In a first illustrative example, the subset of expanders can include two expanders with angles directed in opposing directions (e.g., where the propagation axis can be split into two propagation axes, symmetric about the original propagation axis, etc.). In a second illustrative example, the subset of expanders can include three expanders, where the expanders on either end of the expander subset include angles pointing in opposing directions and the central expander of the expander subset is oriented at an angle intermediate between the angle of expanders at either end (e.g., where the propagation axis can be split into three propagation axes, symmetric about the propagation axis, etc.). In a third illustrative example, the subset of expanders can include four expanders where the expanders at either end are pointing in the opposite directions and the expanders in the middle are directed in opposing directions, where the expanders in the middle are directed at an angle intermediate between the expanders at the end (e.g., where the propagation axis can be split into four propagation axes, symmetric about the original propagation axis, etc.). However, the expander subset can include any suitable number of expander and each of the expanders can have any angle (e.g., be directed in any direction).

Figure 4B:
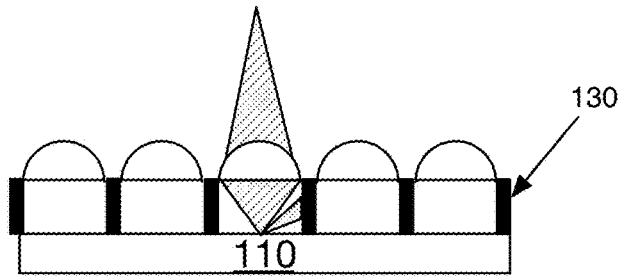
FIG. 4B is a schematic representation of an example of a flip controller removing the source of the flip as shown in FIG. 4A.
Figure 5A:
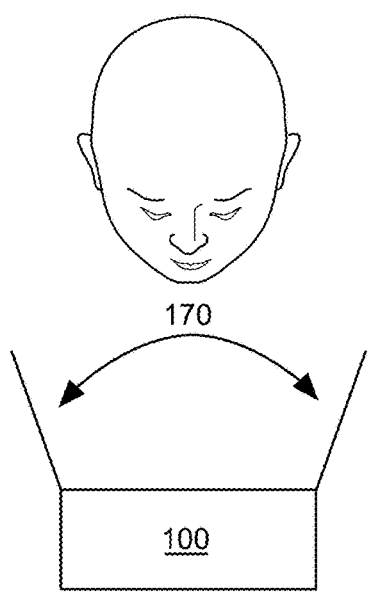
FIG. 5A is a schematic representation of a plan view from the top of an example of a viewcone for a display.
Figure 5C:
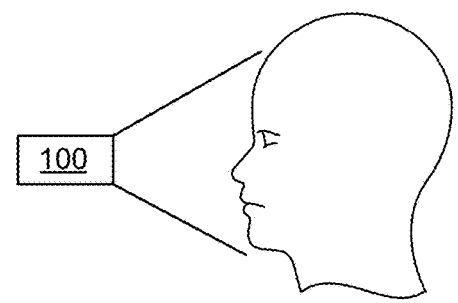
FIG. 5C is a schematic representation of an elevation view from the side of an example of a viewcone for a display.
Figure 5B:
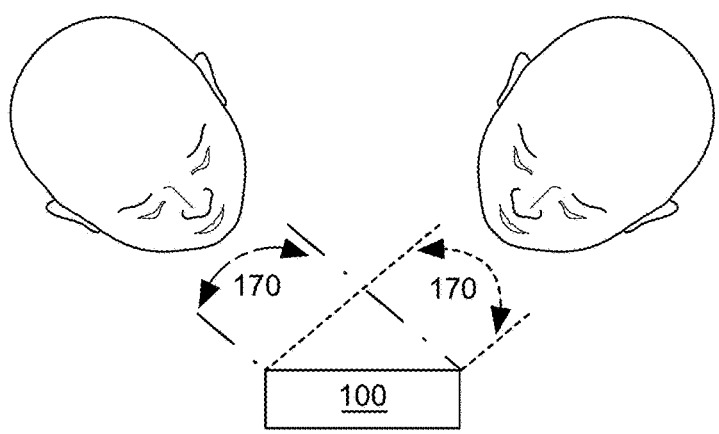
FIG. 5B is a schematic representation of a plan view from the top of an example of an expanded viewcone for a display.
Figure 5D:
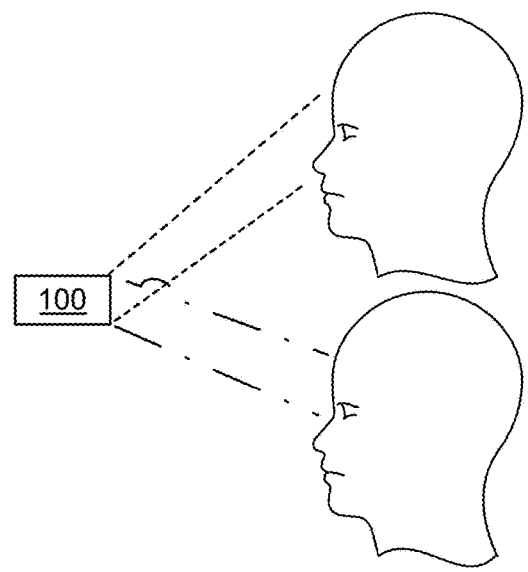
FIG. 5D is a schematic representation of an elevation view from the side of an example of an expanded viewcone for a display.

The flip controller(s) 130 preferably functions to reduce (e.g., (e.g., by 10%, 20%, 30%, 40%, 50%, 60%, 70%, 80%, 90%, 100%, etc.) and/or eliminate the perception of flip from the displayed free-space 3D image(s). As shown for example in FIG. 4A, the source of the flip can result from light (e.g., associated with views) from the screen (e.g., a pixel or subpixel of the screen) that is collected by elements of the parallax generator (e.g., lenticules) that are not associated with that pixel (e.g., adjacent lenticules). The flip controller can reduce and/or eliminate the perception of flip by: blocking light from a pixel reaching lenticules other than the associated lenticule (e.g., as shown in FIG. 4B), by generating destructive interference at locations where views should not be perceived, generating constructive interference at locations where views should be perceived, reducing stray light, and/or in any manner. Each flip controller can be reflective, absorptive, scattering, transmissive, and/or have any suitable optical response to light. The optical response of the flip controller can depend on a polarization state of the light, an intensity of the light, a color of the light, a spectrum of the light, a dispersion of the light, a divergence of the light, and/or on any suitable property(ies) of the light. For instance, a flip controller can selectively transmit light based on the polarization of the incident light. In some variations, crossed or interlaced polarizers can be used. In these variations a first polarizer can be confined to a plane parallel to the screen surface and a second polarizer (e.g., with polarization set at any angle between 0° and 90°, such as 45° or 90°, relative to the first polarizer) can be constrained to a plane underneath the parallax generator (e.g., under the lenticular array). However, the cross polarizers can otherwise be arranged or used to block light and/or reduce the perception of flip. The number of flip controllers can be approximately the same as (e.g., differ by at most 1; 5; 10; 100; 1,000; 10,000; 100,000 etc.) the number of lenticules, approximately the same as the number of expanders of the viewcone expander, approximately the same as the number of pixels, approximately the same as the number of subpixels, and/or any number of flip controllers.

Figure 9:
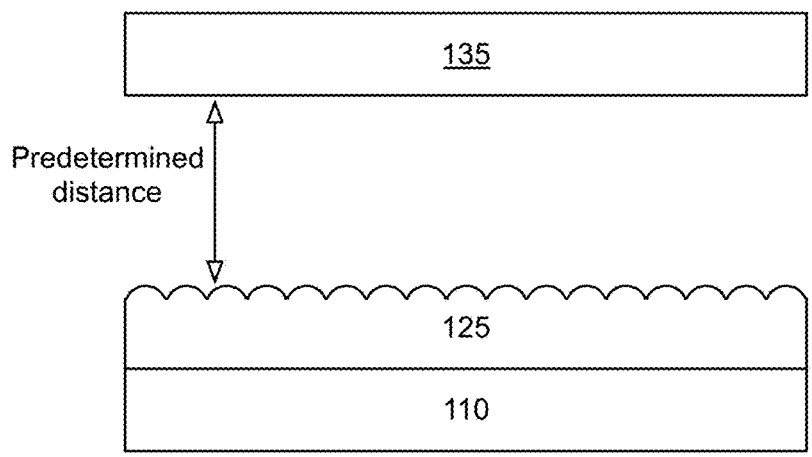
FIG. 9 is a schematic representation of an exemplary display including a screen, a lenticular array, a microlouver film (e.g., offset from the lenticular array by a predetermined distance), and a microlouver support.

The flip controller(s) can be integrated into the parallax generator (e.g., be a coating on an element of the parallax generator), collocated with the parallax generator (e.g., adjacent to, next to, etc.), be a predetermined distance from the parallax generator (as shown for example in FIG. 9), and/or otherwise be related to the parallax generator. In some variants, the flip controller is preferably between about 50 μm and 5 cm (e.g., 50 μm, 100 μm, 200 μm, 500 μm, 1 mm, 2 mm, 5 mm, 1 cm, 2 cm, 5 cm, values therebetween) from the parallax generator. In these variants, when the flip controller is too close to the parallax generator (e.g., in contact with the parallax generator), optical artifacts can be produced (such as producing a different or nondesired appearance because of the lack of an interface, because of the index of refraction of the materials in contact changing a refraction of light rays, etc.), a calibration or shape of the parallax generator or flip controller can be changed, and/or other undesirable effects can arise. Similarly, when the flip controller is too far from the parallax generator, multiple images can be produced (e.g., resulting from the grating-like structure of the privacy film and/or the louvers). In a specific example, the flip controller can have a minimum separation distance (such as a distance above) from the parallax generator, where the minimum separation distance can ensure that the flip controller and parallax generator do not touch or contact (e.g., even in the presence of stress and/or bending). However, in other variants, the flip controller can be less than 50 μm from the parallax generator (e.g., touching the parallax generator, printed on the parallax generator, etc.) and/or greater than 5 cm from the parallax generator; a plurality of flip controllers can be used with each flip controller at a flip controller position, and/or the flip controllers can otherwise be arranged. The flip controller(s) can additionally or alternatively be mounted or disposed on a substrate 132 (e.g., made of an optical device material), on a side of or in the parallax generator (e.g., a side of a lenticular array that is not curved, a side of a lenticular array that is curved, etc.), on or in the screen (e.g., on or in a color filter, glass cover, polarizer, etc. of a screen), and/or otherwise be mounted.

Light 185 (e.g., from the screen) preferably interacts with (e.g., passes through) the parallax generator before interacting with (e.g., passing through) the flip controller. However, light can interact with the parallax generator and flip controller at the same time and/or with the flip controller before the parallax generator (e.g., as shown for example in FIG. 15).

The flip controller can define a flip controller viewcone 131, where light (e.g., from the screen) within the flip controller viewcone can reach a viewer (and/or otherwise be projected from a display, not be blocked by the flip controller view cone, etc.) and light outside of the flip controller viewcone can be blocked and/or otherwise be prevented from reaching a viewer (or being projected from a display or past the flip controller viewcone). The flip controller viewcone can block light (or views) in one dimension (e.g., views can be confined along a first axis, such as a horizontal axis, but not confined by the flip controller viewcone along a second axis, such as a vertical axis), two dimensions (e.g., views can be confined by the flip controller viewcone along a first axis and a second axis such as a horizontal and vertical axis), along one or more directions (e.g., blocking light from traveling outside of a predetermined region), and/or can otherwise block light from traveling in any suitable regions of space. However, the flip controller viewcone can otherwise be defined.

Figure 6A:
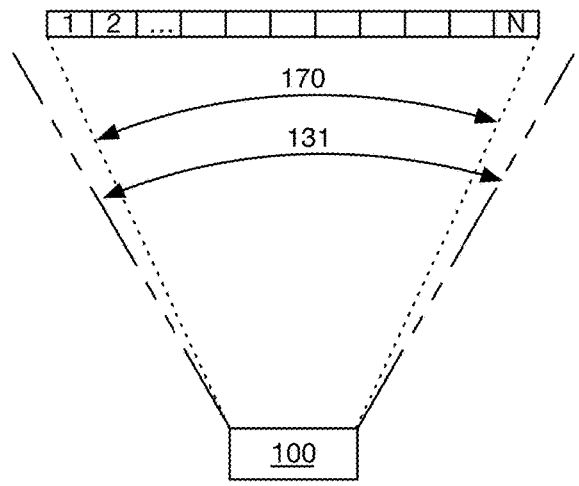
FIGS. 6A, 6B, and 6C are examples of relative display and filter viewcones, where views in gray are blocked (e.g., not perceived) because of the filter viewcone.
Figure 6B:
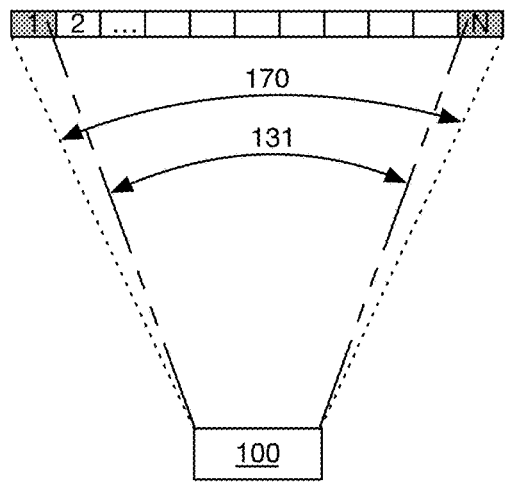
Figure 6C:
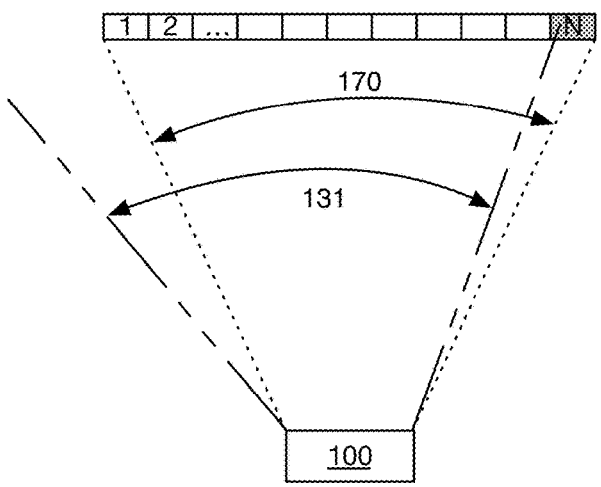

The flip controller viewcone can be larger than the display viewcone (as shown for example in FIG. 6A), smaller than the display viewcone (as shown for example in FIG. 6B), and/or the same size as the display viewcone. The flip controller viewcone and the display viewcone can be aligned (e.g., as manufactured be aligned, be calibrated and/or characterized, etc.) or not aligned. The flip controller viewcone and the display viewcone can be substantially perfectly aligned (e.g., have coincident central axes), aligned along one or more axes (e.g., along an x-axis, a y-axis, a z-axis, etc.) and misaligned along at least one other axis, and/or otherwise aligned. A center of the flip controller viewcone and the display viewcone is preferably within about 5° of each other (e.g., to enable light and/or views to be projected substantially straight out of the screen and/or perceived approximately symmetrically about the screen; as shown for example in FIG. 6A, 6B, or 6C; etc.), however, the center of the flip controller viewcone and the display viewcone can differ by greater than 5°.

The flip controller(s) can be arranged between the parallax generator and the screen, between the parallax generator and the optical volume, between elements of the parallax generator (e.g., flip controllers can be arranged between elements of the parallax generator such as lenticules), between elements of the viewcone expander (e.g., flip controllers can be arranged between expanders), partial or fully surrounding elements of the parallax generator, partially or fully surrounding elements of the parallax generator, adjacent to the screen, adjacent to the view cone expander, adjacent to the optical elements, adjacent to the optical volume, adjacent to the parallax generator, and/or otherwise arranged. In a specific example, a flip controller can be between each lenticule of a lenticular array and/or between each expander of a viewcone expander. However, flip controllers can be between and/or (partially or fully) surround subsets of lenticules, subsets of expanders, and/or otherwise arranged. In variants, the flip controller can be integrated into the parallax generator, the viewcone expander, the screen, the optical volume, optical elements, and/or any component.

In variants, the flip controller(s) can extend from the screen to a base (e.g., side of the parallax generator proximal the screen) of the parallax generator, from the screen to the parallax generator (e.g., a side of the parallax generator distal the screen, a middle of the parallax generator, etc.), from the screen to the viewcone expander (e.g., a base of the viewcone expander, an end of the viewcone expander, etc.), from the viewcone expander to the parallax generator, extend from a surface of the optical volume, and/or be arranged in any manner.

The flip controller(s) can be active or passive. Each flip controller can include one or more: baffles (e.g., optical baffle), louvers, filters (e.g., color filter, neutral density filter, etc.), specular surfaces (e.g., mirrors), polarization optics (e.g., polarizers, waveplates, etc.), diffraction elements (e.g., gratings, prisms, grisms, etc.), structures (e.g., rectangular prisms), and/or any suitable components. Each flip controller(s) can be made of polymer, glass, crystals, metal, and/or any suitable material.

The index of refraction of the flip controller is preferably matched to adjacent materials (e.g., within a predetermined threshold of such as ±0.001, ±0.002, ±0.005, ±0.01, ±0.02, ±0.05, ±0.1, ±0.2, values therebetween, etc.; such that a reflectance of light at an interface between the flip controller and adjacent media is less than a threshold such as <5%, <2%, <1%, <0.5%, <0.2%, <0.1%, <0.05%, <0.02%, <0.01%, <0.001%, <0.0001%, values therebetween, etc.; etc.). However, in variants, the flip controller can be made of or include a material with a different index of refraction from the surrounding optical material (e.g., air, polymer, etc.). In these variants, the index of refraction of the flip controller can be higher than the surrounding medium (e.g., to increase the amount of light reflected at an interface between the flip controller and the surrounding medium, to increase the amount of or direct the bending for light passing through the flip controller, etc.) or lower than the index of refraction of the surrounding material.

In a first embodiment, a flip controller can include a privacy film 135. The privacy film can include an array of louvers 136, an optional filler 138, a support structure 139, and/or any suitable components. The privacy film (and/or components thereof) can be made of or include polymers, nanomaterials (e.g., carbon nanomaterials, nanoparticles, etc.), metals, crystals, glasses, inks, and/or any suitable materials. The thickness of the privacy screen (and/or components thereof) can be any value between about 10 µm and 1 mm (such as 10 µm, 20 µm, 40 µm, 50 µm, 75 µm, 100 µm, 125 µm, 150 µm, 175 µm, 200 µm, 250 µm, 300 µm, 350 µm, 400 µm, 450 µm, 480 µm, 500 µm, 550 µm, 600 µm, 650 µm, 700 µm, 800 µm, 900 µm, 1000 µm, values therebetween, etc.). However, the thickness of the privacy screen or components thereof can be less than 10 µm or greater than 1 mm.

The louvers 136 preferably function to block the transmission of light along a predetermined directions through the privacy film. The louvers of the array are preferably microlouvers (e.g., louvers with one or more dimension on a micrometer size scale such as between about 1 µm to 1000 µm), but can be nanolouvers (e.g., louvers with one or more dimension on a nanometer size scale such as between about 1 nm and 1000 nm), macrolouvers (e.g., louvers with one or more dimension on a size scale greater than about 1000 µm), and/or any suitable louvers.

The width (e.g., narrowest width, broadest width, average width, etc.) of each louver can be between about 10 nm and 100 cm (e.g., 10 nm, 20 nm, 50 nm, 100 nm, 200 nm, 500 nm, 1 µm, 2 µm, 5 µm, 10 µm, 20 µm, 50 µm, 100 µm, 1 mm, 2 mm, 5 mm, 1 cm, 2 cm, 5 cm, 10 cm, 20 cm, 50 cm, 100 cm, values therebetween), but can be less than about 10 nm or greater than about 100 cm. In a first specific example, for instance for a desktop display (e.g., a display with a dimension between about 5 to 50 inches, a display that fits on a desktop), the width of a louver can be between about 1 µm and 100 µm. In a second specific example, for instance for a billboard or other signage (e.g., a display with a dimension on the order of several feet), the width of a louver can be between about 1 mm and 50 cm. However, any suitable width louvers can be used. The width is preferably approximately the same for each louver (e.g., within a predetermined tolerance or threshold such as 1%, 2%, 5%, 10%, 20%, etc.), but can be different for a subset of louvers.

The height (e.g., narrowest height, broadest height, average height, extent to which the louver(s) penetrate or extend into the filler material, etc.) of each louver can be between about 10 nm and 100 cm (e.g., 10 nm, 20 nm, 50 nm, 100 nm, 200 nm, 500 nm, 1 µm, 2 µm, 5 µm, 10 µm, 20 µm, 50 µm, 100 µm, 1 mm, 2 mm, 5 mm, 1 cm, 2 cm, 5 cm, 10 cm, 20 cm, 50 cm, 100 cm, values therebetween), but can be less than about 10 nm or greater than about 100 cm. In a first specific example, for instance for a desktop display (e.g., a display with a dimension between about 5 to 50 inches, a display that fits on a desktop), the height of a louver can be between about 1 µm and 100 µm. In a second specific example, for instance for a billboard or other signage (e.g., a display with a dimension on the order of several feet), the height of a louver can be between about 1 mm and 50 cm. However, any suitable height louvers can be used. The height is preferably approximately the same for each louver (e.g., within a predetermined tolerance or threshold such as 1%, 2%, 5%, 10%, 20%, etc.), but can be different for a subset of louvers.

The louvers preferably taper (e.g., away from the base, toward the base, etc.), but can be concave, convex, aspheric, approximately constant in size, and/or otherwise vary from a base to a tip. The louvers preferably taper into the filler (e.g., widest portion of the louver is proximal an outer surface of the filler), but can taper out of the filler, and/or otherwise taper. The taper angle is preferably between about 0° and 20° (e.g., 0°, 0.5°, 1°, 2°, 5°, 10°, 15°, 20°, values therebetween), but can be greater than 20°. The taper angle is preferably approximately the same for each louver (e.g., within a predetermined tolerance or threshold such as 1%, 2%, 5%, 10%, 20%, etc.), but can be different for a subset of louvers.

The louvers can have one or more smooth faces, include a set of optical features (e.g., moth eye structures 137) along an exterior surface, include a set of optical features along an interior surface, include mechanical features (e.g., a barb or baffle structure such as with the features directed toward or away from the screen and operable to block light reflected from the louver), include absorptive features (e.g., coating the louvers, coloring the louvers, in-mold decoration of the louvers, woven or velvet-like structures, etc.), and/or include any other suitable surface feature. The surface features can function as antireflective surfaces, to block stray light, and/or otherwise function.

The louvers are preferably absorptive (e.g., absorb visible radiation, absorb light, absorb electromagnetic radiation with a wavelength between about 380 and 800 nm, etc.), but can be scattering (e.g., inelastically scatter light for instance to convert light from a visible wavelength to an ultraviolet and/or infrared wavelength such that the light is no longer perceived by a viewer; elastically scattering; etc.), reflective, transmissive, and/or otherwise interact with light.

Figure 7A:
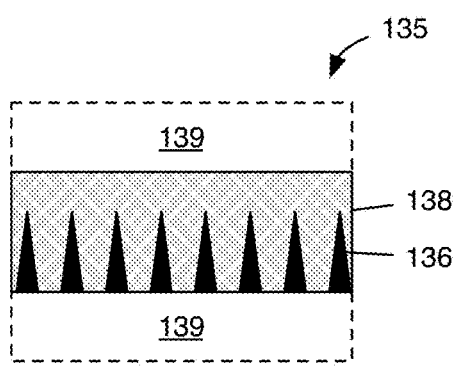
FIGS. 7A and 7B are schematic representations of exemplary microlouver arrays with uniform and nonuniform louver positioning, respectively.
Figure 7B:
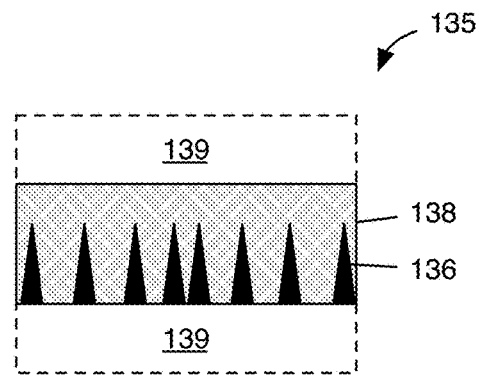

The louvers can be uniformly separated (e.g., as shown for example in FIG. 7A) and/or nonuniformly separated (e.g., as shown for example in FIG. 7B). The separation distance (e.g., pitch) between louvers can be between about 10 nm and 100 cm (e.g., 10 nm, 20 nm, 50 nm, 100 nm, 200 nm, 500 nm, 1 µm, 2 µm, 5 µm, 10 µm, 20 µm, 50 µm, 100 µm, 200 µm, 300 µm, 500 µm, 750 µm, 1 mm, 2 mm, 5 mm, 1 cm, 2 cm, 5 cm, 10 cm, 20 cm, 50 cm, 100 cm, values therebetween, 10-1000 µm, 20-200 µm, 300-500 µm, 20-500 µm, 10-100 µm, 100-1000 µm, etc.), but can be less than about 10 nm or greater than about 100 cm. The separation distance can be measured between the bases of adjacent louvers, the tips of adjacent louvers, the bodies of adjacent louvers, the projection of adjacent louvers onto a common plane, and/or otherwise measured. In a specific example of a nonuniform separation, the louvers can be closer together proximal a center (e.g., a horizontal center, a vertical center, etc.) of the screen and spaced further apart (or closer together) the further the louvers are from the center of the screen (e.g., along one or more dimensions). The spacing can change linearly, polynomially (e.g., quadratically, cubically, quartically, quantically, etc.), exponentially, logarithmically, trigonometrically, and/or in any manner (e.g., cooperatively form a spacing gradient). The spacing (e.g., size of the spacing, spacing gradient, direction(s) of the spacing gradient, etc.) can depend on the display (e.g., pixels of the screen, pixels assigned to one or more view, display calibration, etc.), on the free space 3D image, depend on the wavelength of light, and/or can otherwise depend on any suitable properties.

The louvers can be aligned to (e.g., substantially parallel to such as within ±0.1°, ±0.5°, ±1°, ±5°, ±10°, etc.) the propagation axis, to an angle (e.g., of the viewcone expander, of the parallax generator, etc.), and/or relative to any suitable reference axis. However, the louvers can be anti-aligned to (e.g., substantially perpendicular to such as within ±0.1°, ±0.5°, ±1°, ±5°, ±10°, etc. of perpendicular to) the propagation axis, to an angle (e.g., of the viewcone expander, of the parallax generator, etc.), and/or have any suitable orientation relative to one or more reference axes. In variants where the louvers have a tilt, the louvers can be tilted to the same or different angles, in the same or different directions (e.g., such that the viewcone is channeled in that direction), have a convergent tilt (e.g., such that the filter view cone converges which can be beneficial for viewers at a known viewer distance), have a divergent tilt (e.g., such that the filter view cone diverges), and/or can have any suitable tilt (e.g., relative to a reference axis such as the propagation axis). In variants, different subsets of louvers can be aligned to different references. For instance, a first subset of louvers can be aligned to a first angle (e.g., of a parallax generator, of a viewcone expander, etc.), a second subset of louvers can be aligned to the propagation axis, and a third subset of louvers can be aligned to a second angle (e.g., of a parallax generator, of a viewcone expander, etc.). However, the louvers can have any suitable angle or orientation.

The filler 138 is preferably optically transparent (e.g., allows light, electromagnetic radiation with a wavelength between about 380 and 800 nm, visible radiation, etc. to pass through), but can be reflective, scattering, absorptive, and/or have any suitable optical properties. As shown for example in FIGS. 7A and 7B, the louvers preferably extend into the filler (e.g., the filler fills gaps between the louvers). However, the louvers can extend outward from the filler, can be detached from the filler, and/or can have any suitable orientation relative to the filler.

The filler is preferably index matched to (e.g., within a predetermined threshold of such as ±0.001, ±0.002, ±0.005, ±0.01, ±0.02, ±0.05, ±0.1, ±0.2, values therebetween, etc.; such that a reflectance of light at an interface between the filler material controller and louvers is less than a threshold such as <5%, <2%, <1%, <0.5%, <0.2%, <0.1%, <0.05%, <0.02%, <0.01%, <0.001%, <0.0001%, values therebetween, etc.; etc.) the louver array. However, the filler material and the louver array can not be index matched (e.g., filler can have a higher or lower index of refraction than the louver array). The filler can be solid, liquid, amorphous, or have any other physical state.

In a first variant, the filler material and the louver material can be chosen so that the filler and the louvers are index matched.

Figures 8A, 8B, 8C:
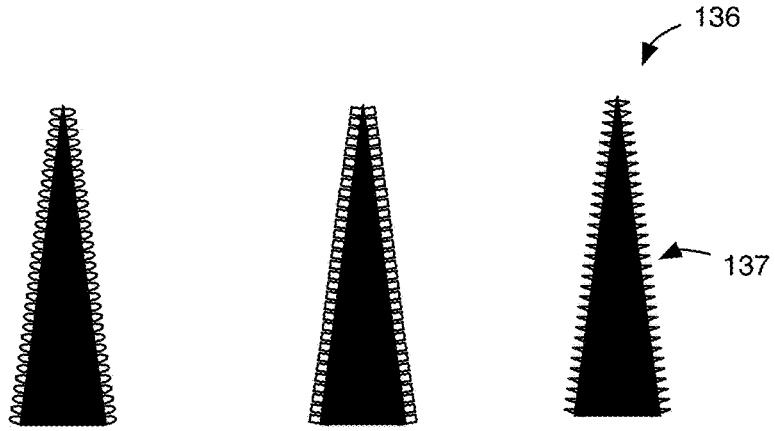
FIGS. 8A, 8B, and 8C are schematic representations of exemplary microlouvers with motheye structures.

In a second variant, an interface between the filler and the louvers can be configured to index match the filler and the louvers. For instance, the louvers and/or the filler can include an antireflection coating (e.g., between the louvers and the filler such as a single interference coating, a multi-interference coating, an absorbing coating, etc.), can have a gradient index (e.g., such that the index of refraction approximately continuously changes along the interface) between the louvers and the filler, and/or the interface can otherwise be configured to index match the filler and the louvers. In an illustrative example as shown in FIGS. 8A-8C, each louver can include a moth eye structures 137 (e.g., typically subwavelength scale structures that can be random' pseudorandom; aligned to a grid such as a hexagonal or rectangular grid; etc.) such as parabolic structures, cylindrical structures, prismatic structures, pyramidal structures (e.g., truncated pyramids), hemispherical structures, hemiellipsoidal structures, conical structures, and/or any suitable structures. At least one dimension (e.g., length, width, height, radius, radius of curvature, etc.) of the moth eye structures is preferably subwavelength (e.g., less than about 10 nm, 50 nm, 100 nm, 150 nm, 200 nm, 250 nm, 300 nm, 350 nm, 380 nm, 400 nm, 450 nm, 500 nm, 550 nm, 600 nm, 650 nm, 700 nm, 750 nm, 800 nm, values therebetween, etc.), but can be approximately the same size as the wavelength of light and/or larger than the wavelength of light. The moth eye structures 137 can be arranged in an array, columns, rows, a spiral (e.g., encircling the louver's primary axis), randomly, and/or otherwise arranged. The separation distance between moth eye structures is preferably sub wavelength (e.g., less than about 10 nm, 50 nm, 100 nm, 150 nm, 200 nm, 250 nm, 300 nm, 350 nm, 380 nm, 400 nm, 450 nm, 500 nm, 550 nm, 600 nm, 650 nm, 700 nm, 750 nm, 800 nm, values therebetween, etc.), but can be approximately the same size as the wavelength of light and/or larger than the wavelength of light. However, any suitable moth eye structure can be used. In a third variant, the filler material and the louver material can be index matched and the interface can be configured to be index matched (e.g., according to the second variant). In a fourth variant that can be particularly but not exclusively beneficial for large screens and/or large viewing distances, the filler material can be air. However, the filler and louver array can otherwise be index matched.

The support preferably functions to provide mechanical support to the privacy film. The support can be index matched to and/or have an index mismatch with the filler, the louvers, and/or other optical components. The support can be on the same side of the filler as the louvers (e.g., a base of the louvers), on an opposing side of the filler (e.g., a side of the filler opposing a base of the louvers), along an edge of the filler (e.g., around a frame of the display such as using the mechanical strength of a louver to support the louver), and/or on any side(s) of the filler. The privacy film can include one or more than one support (e.g., two supports as shown for example in FIGS. 7A and 7B).

In the first embodiment, a privacy screen viewcone (e.g., flip controller viewcone generated from the privacy screen and/or louver array thereof) can be determined based on and/or depend on a louver size (e.g., height, width, etc.), separation distance, separation gradient, louver optical properties (e.g., index of refraction such as absolute index of refraction, index of refraction difference relative to adjacent material, etc.; scattering coefficient, etc.), a louver taper angle, and/or any properties of the privacy screen.

However, a privacy screen can otherwise be configured.

In a second embodiment, a flip controller can include one or more baffles. The baffles can include a wire array (e.g., a nanowire array, microwire array, microwire array, coextensive baffles such as integrated into a cohesive unit, etc.), discrete or separate light shields (e.g., noncoextensive baffles), and/or any suitable components. The baffles can be particularly, but not exclusively, beneficial for reducing crosstalk between lenticules (e.g., reduces light rays that are transmitted by a lenticule other than a target lenticule). The baffles can be arranged between rows of lenticules, columns of lenticules, adjacent lenticules, both rows and columns of lenticules, a subset of lenticules (e.g., based on a crosstalk between lenticules), and/or between any suitable lenticules. The baffles can partially (e.g., 5%, 10%, 20%, 30%, 40%, 50%, 60%, 70%, 80%, 90%, 95%, etc.) or completely fill the space between adjacent lenticules. The index of refraction of the baffle(s) is preferably matched to adjacent material (e.g., the lenticules, a filler or support material surrounding the lenticules and/or baffles, etc.). The baffles are preferably absorptive (e.g., absorb visible radiation, absorb light, absorb electromagnetic radiation with a wavelength between about 380 and 800 nm, etc.), but can be scattering (e.g., inelastically scatter light for instance to convert light from a visible wavelength to an ultraviolet and/or infrared wavelength such that the light is no longer perceived by a viewer; elastically scattering; etc.), reflective, transmissive, and/or otherwise interact with light.

Figures 15A, 15B:
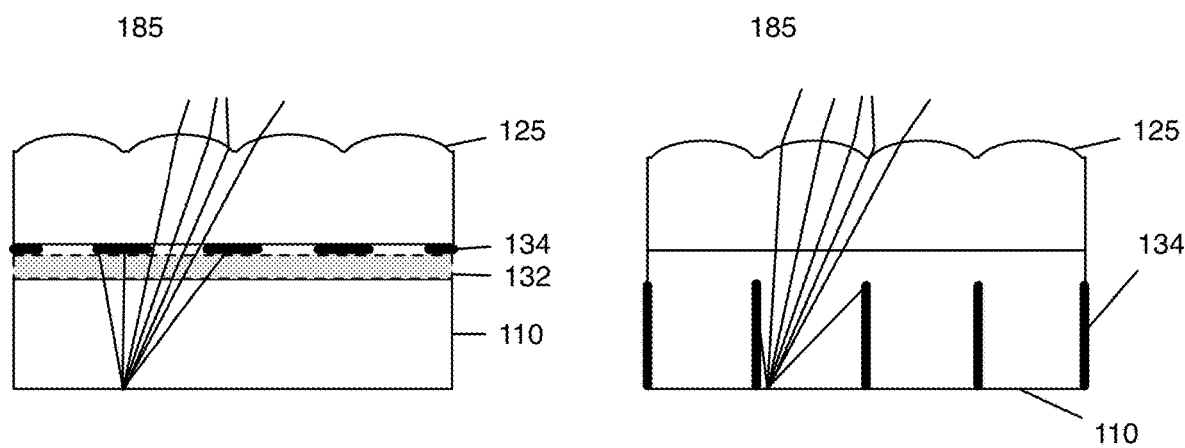
FIGS. 15A and 15B are schematic representations of examples of using a flip controller (e.g., a light blocker, a printed blocker, etc.) to direct or control the pathways that light from a screen can take through the lenticular array.

In a third embodiment, as shown for example in FIGS. 15A and 15B, a flip controller can include one or more light blockers 134. The light blockers function to block light from passing through stray paths. The light blockers can function similarly to a privacy film (e.g., as described in the first embodiment), and/or function differently. The light blockers can be arranged in a plane of the screen (e.g., on a face of the screen, as shown for example in FIG. 15A, etc.), in a plane of the parallax generator (e.g., on a planar face of a lenticular array, as shown for example in FIG. 15A, etc.), parallel to the propagation axis (and/or to any reference axis), perpendicular to a plane of the screen (e.g., perpendicular to a face of the screen, as shown for example in FIG. 15B, etc.), perpendicular to a plane of the parallax generator (e.g., perpendicular to a face of the parallax generator, as shown for example in FIG. 15B, etc.), perpendicular to the propagation axis (and/or to any reference axis), at an angle (e.g., between 0° and 90°) relative to the propagation axis (and/or any reference axis), at an angle (e.g., between 0° and 90°) relative to a face of the screen, at an angle (e.g., between 0° and 90°) relative to a face of the parallax generator, and/or otherwise be arranged relative to any suitable component. The light blockers can be beneficial as they can leverage simpler manufacturing techniques (e.g., printing), can be integrated into the display (or component thereof) manufacture, and/or can otherwise be beneficial. By varying the ratio of the blocked and opened areas, the dimming of the flip relative to the dimming of the desired holographic image (e.g., the contrast between the desired and non-desired image) can be tuned. However, the relative contrast can otherwise be controlled. The amount of blocked (or open) area can be any percentage between about 0.1% and 99.9% (such as 0.1%, 0.2%, 0.5%, 1%, 2%, 5%, 10%, 20%, 50%, 80%, 90%, 95%, 98%, 99%, 99.5%, 99.8%, 99.9%, values therebetween) of the available screen or propagation area (e.g., the area of the lenticular array, area of the screen, area of the parallax generator, etc.). However, any suitable area (or region) can be blocked. The light blocker(s) can be on a surface of the parallax generator, within the parallax generator, on the screen (e.g., on a color filter, glass cover, polarizer, etc. of a screen), in the screen (e.g., on a color filter, glass cover, polarizer, etc. of a screen; extending fully or partially such as 10%, 20%, 30%, 40%, 50%, 60%, 70%, 80%, 90%, 95%, values therebetween, etc. of the screen or component thereof), and/or otherwise be arranged. In a first variant, the light blockers can include opaque dark strips (e.g., that can be printed with a predetermined pattern). The pattern (e.g., the pitch of or spacing between the light blockers) is preferably related to (e.g., approximately the same as; is a multiple of such as 2×, 3×, 4×, etc.; greater than such as 1.01×, 1.05×, 1.1×, 1.2×, 1.5×, etc. the pitch; less than such as 0.99×, 0.95×, 0.9×, 0.8×, 0.5×, etc.; etc.) the pitch of the lenticular array (e.g., at the designated location so that pathways of selected angles for selected pixels are blocked), but can match a pixel pattern (e.g., pixel pitch), a subpixel pattern (e.g., subpixel pitch), and/or any suitable pattern. The opaque dark strips can be printed on a substrate or at the back of the lenticular directly. For example, pixels at or close to the boundary of two lenticules can have a greater contribution to the flip (e.g., relative to pixels farther from a boundary between lenticules). In this example, the light blockers can be placed on top of the pixels closer to the lenticule boundary so that their light pathways are more efficiently blocked relative to that of other pixels. However, the light blockers can otherwise be arranged. In a second variant, the light blocker can include a liquid crystal screen, which can be beneficial for dynamically control the brightness and contrast. However, any suitable light blocker(s) can be used.

In a fourth embodiment, a display can include a privacy screen (e.g., from the first embodiment of the flip controller), baffle(s) (e.g., from the second embodiment of the flip controller), and/or light blocker(s) (e.g., from the third embodiment of the flip controller).

However, any suitable flip controller(s) can be used.

The optical volume 150 functions to enhance the perception of (e.g., the perception of depth, smoothing artifacts, etc.) the free-space 3D image. The optical volume can improve the separation between views, change the perceived size of objects in the view(s), provide depth guide for the view(s), and/or otherwise enhance the perception of the free-space 3D image. The optical volume is preferably close to (e.g., within a threshold distance of, within 50 µm-1 cm of, etc.), but separated from (e.g., by an air gap), the parallax generator, but can be in contact with the optical elements, the screen, the viewcone expander, the flip controller, the parallax generator, and/or with any suitable component. The optical volume can include (e.g., be demarcated by, be defined by, be marked with, etc.) volumetric guides which can function to indicate or facilitate perception of the optical volume.

The optical volume is preferably transparent (e.g., transmits >90% of visible radiation), but can be semi-transparent (e.g., transmits >10%, >25%, >50%, >75%, >80%, etc. of visible radiation), reflective, and/or can have any suitable optical scattering properties. The optical volume can have any suitable index of refraction between about 0 and 3 such as 1.3, 1.35, 1.4, 1.45, 1.5, 1.6, 1.7, 1.75, 2, 2.5, 3, and/or any suitable index of refraction. The optical volume is preferably a rectangular prism, but can be any three dimensional shape.

The optical volume can be made of the same material as the lenticular array and/or a different material. For example, the optical volume can be made of or include polymer (e.g., polymethylmethacrylate (PMMA) such as acrylic, polyphosphonate, polyphosphazene, polyferrocenes, polyferrocenylsilanes, Polycarbodiimide, polymer nanocomposites, etc.), glass (e.g., flint glass, indium tin oxide (ITO), borosilicate, fused silica, etc.), fluids (e.g., liquids such as water, oil, etc.; gases such as air; etc.), crystals (e.g., diamond, sapphire, silicon carbide, quartz, zirconia, ZnTe, titanium oxide, silicon nitride, etc.), and/or any suitable material.

Figure 16A:
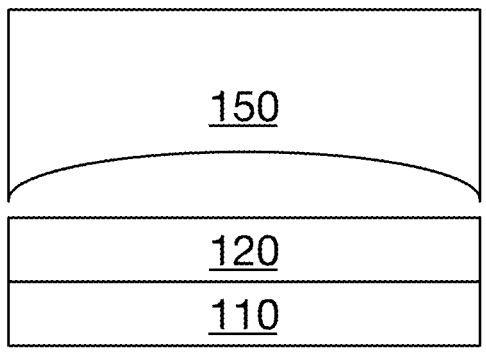
FIGS. 16A and 16B are schematic representations of exemplary optical volumes that include a lens.
Figure 16B:
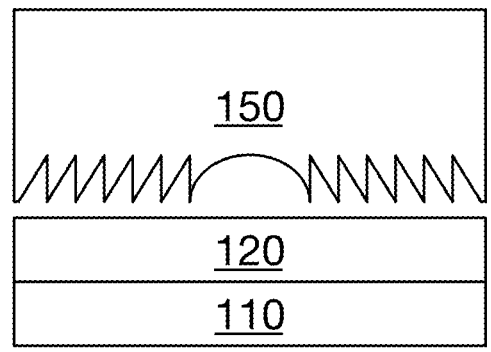

One or more surfaces of the optical volume can be planar, angled, convex, concave, sawtooth, and/or otherwise configured. In a first specific example, as shown in FIG. 16A, a surface of the optical volume (e.g., the surface proximal the parallax generator, the surface distal the parallax generator, etc.) can be concave (e.g., in one, two, or three dimensions such as laterally; longitudinally; through a thickness of the optical volume; along a reference axis such as a pixel alignment axis, a parallax generator axis, etc.; etc.) such as to define a cylindrical lens, spherical lens, aspherical lens, acylindrical lens, parabolic lens, and/or lens. In a second specific example, as shown in FIG. 16B, a surface of the optical volume (e.g., the surface proximal the parallax generator, the surface distal the parallax generator, etc.) can include a set of concentric rings and/or cylinders such as to define a Fresnel lens.

In variants of the optical volume including two or more materials, the materials preferably have different indices of refraction (e.g., index of refraction differs by 0.01, 0.02, 0.03, 0.05, 0.07, 0.1, 0.12, 0.15, 0.17, 0.2, 0.3, 0.4, 0.5, 0.7, 1.0, 1.1, 1.2, 1.5, 2, 2.5, 3, 0.01-0.1, 0.05-0.4, 0.2-1, 0.5-5, etc.; 0.5%, 1%, 5%, 10%, 20%, etc.; etc.). However, the materials can have substantially identical indices of refraction (e.g., index of refraction differs by <0.01, <0.5%, etc.), large index of refraction differences (e.g., index of refraction differs by >5, >20%, etc.), and/or any suitable index of refraction.

The optical volume can optionally include volumetric guides 155 which can function to enhance the optical perception of the free-space 3D image by providing a reference plane within the viewers perception. The volumetric guides can be reflective, transmissive, scattering, emissive, and/or have any suitable optical properties. The volumetric guides can surround the optical volume, surround part of the optical volume, be at discrete points, and/or be arranged in any location. In an illustrative example, a volumetric guide can include a light guide and a light source that can generate a volumetric guide that surrounds or partially surrounds the optical volume.

Figure 2C:
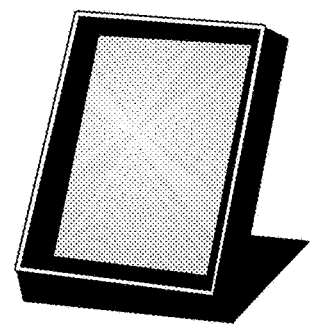

In some embodiments, the optical volume can be defined by a frame surrounding the optical volume. In these embodiments, the optical volume can be a volume enclosed or surrounded by the frame, extend into an external environment proximal the frame (including or excluding the enclosed volume), and/or can otherwise be arranged. In a specific example as shown in FIG. 2C, a frame can include one or more reflective (e.g., mirrored) surfaces directed toward the optical volume. The surfaces can act as volumetric guides 155. In variations of this specific example, the optical volume can be in free space (e.g., air), which can enable a viewer to directly interact with the free-space 3D image. However, the optical volume can be an enclosed volume (e.g., where a viewer cannot directly interact with the free-space 3D image; a high index optical block for instance with an index of refraction $n \geq 1.4$, 1.5, 1.6, 1.7, 1.8, 2.0, etc.; etc.), be defined by a surface of an optical components, and/or have any suitable properties.

In specific examples, the display can include any suitable display and/or display component as disclosed in U.S. Pat. No. 10,241,344 entitled 'ADVANCED RETROREFLECTING AERIAL DISPLAYS', filed on 28 Nov. 2018 or U.S. patent application Ser. No. 16/374,955 entitled 'SUPER-FREE-SPACE 3D DISPLAY WITH ENHANCED OFF-ANGLE SEPARATION,' filed on 24 Jul. 2018, each of which is incorporated herein in its entirety by this reference. However, any display can be used.

The computing system 300 preferably functions to process and/or generate views, determine user positions, and/or control the sensor(s) and/or display. The computing system can be local (e.g., to a display, to a sensor, etc.), remote (e.g., cloud computing, server, network, etc.), and/or distributed (e.g., between a local and a remote computing system). The computing system can be in communication with the display, the sensor(s), and/or with any suitable components. In some variants, the computing system processes (e.g., renders) the views to account for (e.g., correct) optical aberrations (e.g., coma, distortion, chromatic aberration, spherical aberration, astigmatism, tilt, defocus, Petzval field curvature, etc.) in the views such as optical aberrations resulting from the parallax generator, the optical volume, the optical elements, the viewcone expander, the screen, and/or any component.

Figure 10A:
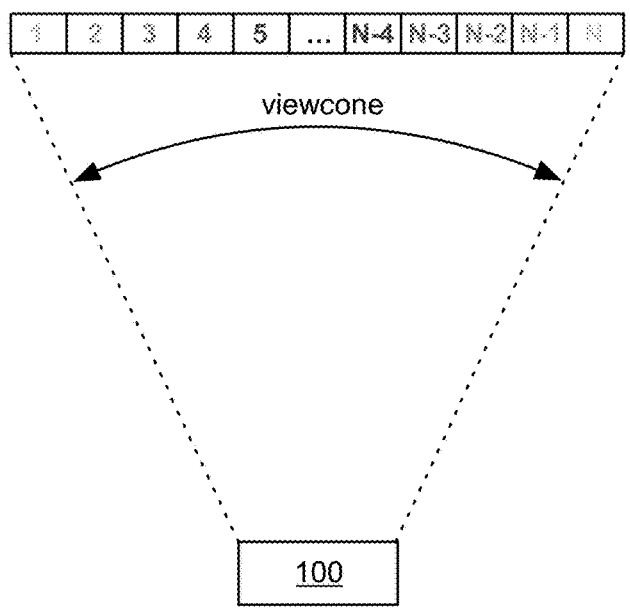
FIGS. 10A and 10B are schematic representations of examples of view dimming.
Figure 10B:
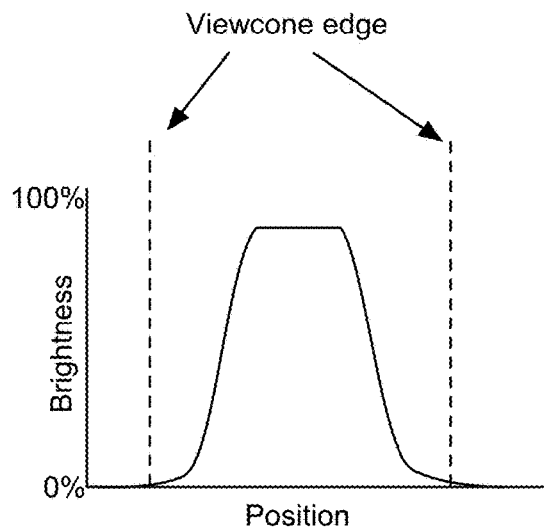

In a specific example, view and/or image processing can include dimming (e.g., attenuating) one or more views of the set of views (that make up the 3D free space image). The brightness of a view can be constant and/or vary across the view (e.g., portions of the view on a first side of the view can be dimmer than portions on a second side of the view). A view can be dimmed by an absolute amount, to a predetermined luminance, to a predetermined brightness, by a relative amount (e.g., a percentage of an absolute view intensity, to a brightness relative to other views such as adjacent or nearby views, etc.), and/or otherwise be dimmed. A view can be dimmed based on a distance between the view and the edge of the viewcone (e.g., display viewcone, flip controller viewcone), an angular separation between the view and the edge of the viewcone (e.g., display viewcone, flip controller viewcone), a number of interceding views between the view and the viewcone (e.g., display viewcone, flip controller viewcone), based on a viewer position (e.g., determined using a tracking sensor such as an eye position of the viewer), based on flip perception (e.g., a simulated flip perception, viewer feedback, etc.), based on the free space 3D image (e.g., content of the image), a viewer or display environment condition (e.g., an environmental brightness, a viewer preference, a selected view mode, an automatic mode selection, etc.), and/or otherwise be dimmed. Views of the set of views can be dimmed symmetrically (e.g., view a and view N−a+1 can be dimmed in the same manner, by the same amount, etc.) and/or asymmetrically. The views can be dimmed by a predetermined amount, according to an equation (e.g., as a function of view position, as a function of distance from a viewcone, as a function of the number of views between the view and a viewcone, etc.), empirically, randomly, pseudorandomly, and/or otherwise be dimmed. For example, views closer to the viewcone (e.g., display viewcone, flip controller viewcone) can be dimmed more than views further from the viewcone. However, views further from the viewcone can be dimmed more than or the same amount as views closer to the viewcone and/or views can otherwise be dimmed. Exemplary functional forms (e.g., proximal the viewcone, across the set of views, between two ends of a viewcone, etc.) can include polynomial functions (e.g., linear, quadratic, cubic, quartic, quintic, etc.), exponential functions, sigmoidal functions (e.g., double sigmoidal functions), logarithmic functions, gaussian function (e.g., super gaussian function), triangle function, Heaviside function, trapezoidal function, as shown for example in FIG. 10B, and/or any suitable function can be used. In an illustrative example, as shown in FIG. 10A, the views closest to the edge of the viewcone can be attenuated by 90% (e.g., displayed at 10% brightness), the next closest views can be attenuated by 60% (e.g., displayed at 40% brightness), the next closest views can be attenuated by 30% (e.g., displayed at 70% brightness), and the remaining views can not be attenuated. In a second illustrative example, as shown in FIG. 10B, the views can be attenuated based on a view position. However, the views can otherwise be attenuated or dimmed.

In a second specific example, view and/or image processing can include lenticularizing the views and/or image based on a calibration of the display. In variations, the lenticularization process can account for and/or adjust the views based on the relationship between the display viewcone and the flip controller viewcone. Lenticularizing the views and/or image can be performed as disclosed in U.S. patent application Ser. No. 17/226,404 titled "SYSTEM AND METHOD FOR GENERATING LIGHT FIELD IMAGES" filed 9 Apr. 2021 incorporated in its entirety by this reference. However, the views and/or image can be lenticularized in any manner.

However, the views and/or image can be processed in any manner.

The sensor(s) 200 preferably function to track the position and orientation (e.g., relative to the display) of one or more viewer, determine an ambient lighting (e.g., proximal the display), and/or perform any function. The sensor is preferably coupled to the display (e.g., in front of the optical volume, to a base of the display, etc.), but can be coupled to any suitable component. In specific examples, the sensor can include: optical sensors (e.g., depth cameras, stereo cameras, interferometry, cameras, etc.), inertial tracking, acoustic tracking (e.g., using ultrasonic emitters, microphones, etc.), magnetic tracking, wireless tracking (e.g., using a set of anchors), eye and/or gaze trackers (e.g., eye-attached tracker, optical gaze tracking, electrical potential gaze tracking, etc.), and/or any suitable sensor(s).

The display (and/or components thereof) can be manufactured using one or more steps including: 3D printing, grinding, polishing, diamond turning, machining, molding, deposition, etching, coating, adhering, cementing, and/or any suitable steps. The steps can be performed iteratively, and/or in any order.

In an illustrative example of a display, the display can include a screen (e.g., a panel, pixelated screen) configured to output light (e.g., directionally or nondirectionally); a lenticular array where the light from the screen passes through the lenticular array; a privacy film including a microlouver array and filler, where the microlouver array is a predetermined distance (e.g., along the light propagation direction) from the lenticular array; and an optical volume (e.g., defined by a frame of the display, a high index optical block, air, environment proximal the display, etc.) where the light is perceived to form a holographic image within the optical volume (e.g., within a volume enclosed by the frame, within a volume of an optical block, within a volume the extends into free space outside of the frame, etc.). In this illustrative example, the microlouver array and filler can be index matched (e.g., index of refraction matched). Variations of this example can include one or more microwires (e.g., microwire arrays, baffles, etc.) arranged between lenticules of the lenticular array. In variations of this example, the lenticules of the lenticular array can be spherical, aspherical, prismatic, and/or otherwise be configured. However the display can otherwise be configured.

In a second illustrative example, a display can include a screen (e.g., a panel, pixelated screen) configured to output light (e.g., directionally or nondirectionally); a lenticular array configured to magnify and/or collimate different portions of the light from the screen (e.g., to generates a light output having viewing angle dependency); a privacy film configured to block light from being transmitted outside of a privacy filter viewcone; and an optical volume (e.g., defined by a frame of the display, a high index optical block, etc.) where the light is perceived to form a holographic image within the optical volume (e.g., within a volume enclosed by the frame, within a volume of an optical block, within a volume the extends into free space outside of the frame, etc.). In variations of this example, the lenticules of the lenticular array can be spherical, aspherical, prismatic, and/or otherwise be configured. For instance, the lenticules can be configured to transmit a first portion (e.g., half of the light) in a vertically or horizontally displaced direction and a second portion (e.g., the remaining light) in an unperturbed or symmetrically displaced direction.

However, the display can otherwise be configured.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An autostereoscopic display comprising:
  a light source configured to output light associated with a plurality of views;
  a lenticular array optically coupled to the light source, wherein each view of the plurality of views is directed in a different direction by the lenticular array;
  a frame defining an optical volume optically coupled to the lenticular array, wherein the plurality of views are perceivable as a three dimensional image within the optical volume; and
  a privacy screen comprising a microlouver array a predetermined distance from the lenticular array, wherein the lenticular array is between the light source and the privacy screen, wherein a microlouver of the microlouver array comprises a motheye structure comprising a tapered micropillar array, wherein a maximum diameter of a micropillar of the tapered micropillar array is at most 380 nm.

2. The autostereoscopic display of claim 1, wherein the privacy screen further comprises a filler, wherein the microlouver array is disposed in the filler.

3. The autostereoscopic display of claim 2, wherein an index of refraction of the filler differs from an index of refraction of the microlouver array by at most 0.05.

4. The autostereoscopic display of claim 1, further comprising a baffle between two lenticules of the lenticular array, wherein light is not transmitted through the baffle.

5. The autostereoscopic display of claim 4, wherein the baffle and the lenticular array are index matched.

6. The autostereoscopic display of claim 4, wherein the baffle absorbs visible light.

7. The autostereoscopic display of claim 1, wherein the predetermined distance is between about 0.1 cm and 1 cm.

8. The autostereoscopic display of claim 7, wherein a pitch of the microlouver array is between about 20-200 micrometers.

9. The autostereoscopic display of claim 1, wherein the frame comprises reflective or emissive surfaces surrounding the optical volume.

10. The autostereoscopic display of claim 1, wherein the lenticular array comprises a prismatic lenticule, wherein the prismatic lenticule comprises a tilt angle between a curved portion of the lenticule and a face of the light source.

11. The holographic display of claim 10, wherein the lenticular array comprises a set of prismatic lenticules, wherein the set of prismatic lenticules are mirror-symmetric about a center of the set of prismatic lenticules.

12. The holographic display of claim 1, wherein the privacy screen is operable to block duplicate views from being displayed.

13. The holographic display of claim 1, wherein the privacy screen is operable to remove a flip artifact from the displayed light.

14. A holographic display comprising:
a light source configured to output light associated with a plurality of views;
a lenticular array optically coupled to the light source, wherein each view of the plurality of views is directed in a different direction by the lenticular array;
an optical volume optically coupled to the lenticular array, wherein the plurality of views are perceivable as a three dimensional image within the optical volume; and
a privacy film configured to block light from being transmitted outside of a privacy film viewcone, wherein the lenticular array is between the light source and the privacy screen, wherein the lenticular array is a predetermined distance from the privacy film, wherein the privacy film comprises a microlouver array disposed within a filler, wherein the microlouver array is index-matched to the filler, and wherein the microlouver array comprises an antireflective coating on an interface between the filler and the microlouver.

15. The holographic display of claim 14, further comprising a baffle configured to reduce a cross-talk between light passing through each lenticule of the lenticular array.

16. The holographic display of claim 15, wherein the baffle is index-matched to the lenticular array or a medium proximal the lenticular array.

17. The holographic display of claim 14, wherein views within a predetermined angular separation of the privacy film viewcone are dimmed.

18. The holographic display of claim 17, wherein an amount of view dimming for each view depends on an angular separation between the respective view and the privacy film viewcone.

19. The holographic display of claim 14, wherein the plurality of views are directed in a lenticular viewcone, wherein a center of the lenticular viewcone and a center of the privacy film viewcone differ by at most 5°.

* * * * *